(12) United States Patent
Zhang et al.

(10) Patent No.: US 12,316,746 B2
(45) Date of Patent: May 27, 2025

(54) CROSS-BLOCKCHAIN DATA PROCESSING METHOD AND APPARATUS, DEVICE, AND COMPUTER STORAGE MEDIUM

(71) Applicant: TENCENT TECHNOLOGY (SHENZHEN) COMPANY LIMITED, Shenzhen (CN)

(72) Inventors: Jianjun Zhang, Shenzhen (CN); Zhigang Lu, Shenzhen (CN); Jinlong Zhang, Shenzhen (CN); Hujia Chen, Shenzhen (CN); Luohai Zheng, Shenzhen (CN); Jun Zang, Shenzhen (CN); Shicheng Feng, Shenzhen (CN); Yang Mo, Shenzhen (CN); Mingyuan Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 306 days.

(21) Appl. No.: 17/716,907

(22) Filed: Apr. 8, 2022

(65) Prior Publication Data

US 2022/0239470 A1 Jul. 28, 2022

Related U.S. Application Data

(63) Continuation of application No. PCT/CN2020/124650, filed on Oct. 29, 2020.

(30) Foreign Application Priority Data

Feb. 3, 2020 (CN) .......................... 202010079180.2

(51) Int. Cl.
*H04L 9/08* (2006.01)
*H04L 9/00* (2022.01)
*H04L 9/32* (2006.01)

(52) U.S. Cl.
CPC .......... *H04L 9/0819* (2013.01); *H04L 9/3247* (2013.01); *H04L 9/50* (2022.05)

(58) Field of Classification Search
CPC ....... H04L 9/0819; H04L 9/50; H04L 9/3247; H04L 9/08; H04L 9/00; H04L 9/32
See application file for complete search history.

(56) References Cited

U.S. PATENT DOCUMENTS

| | | | |
|---|---|---|---|
| 11,093,651 B2 | 8/2021 | Qiu | |
| 2014/0095883 A1* | 4/2014 | Kirillov | ............... H04L 9/0891 713/176 |

(Continued)

FOREIGN PATENT DOCUMENTS

| | | |
|---|---|---|
| CN | 107392608 A | 11/2017 |
| CN | 108009811 A | 5/2018 |

(Continued)

OTHER PUBLICATIONS

The State Intellectual Property Office of the People's Republic of China (SIPO) Office Action 1 for for 202010079180.2 Dec. 16, 2020 13 Pages (including translation).

(Continued)

*Primary Examiner* — Kaveh Abrishamkar
*Assistant Examiner* — Howard H. Louie
(74) *Attorney, Agent, or Firm* — ANOVA LAW GROUP, PLLC

(57) ABSTRACT

A cross-blockchain data processing method is provided. The method includes: obtaining an asset transfer instruction triggered for a first asset on the first blockchain, and configuring an asset state of the first asset to a locked state on the first blockchain; determining the first asset in the locked state as an asset, and determining a cross-chain asset transfer request corresponding to the asset; obtaining an asset transfer interface associated with a second blockchain, and call- (Continued)

ing the asset transfer interface to transmit the cross-chain asset transfer request to a second server node on the second blockchain; and receiving signing response information transmitted by the second server node in response to determining that the verification succeeds, freezing the asset on the first blockchain according to the signing response information, and notifying the second server node to release a second asset associated with the asset on the second blockchain.

20 Claims, 12 Drawing Sheets

(56) References Cited

U.S. PATENT DOCUMENTS

| | | | |
|---|---|---|---|
| 2019/0340586 A1 | 11/2019 | Sheng et al. | |
| 2019/0370798 A1* | 12/2019 | Hu | G06Q 20/389 |
| 2020/0005292 A1* | 1/2020 | Mao | H04L 9/50 |
| 2020/0050690 A1* | 2/2020 | Gaur | H04L 9/50 |
| 2020/0074450 A1* | 3/2020 | Fletcher | G06Q 20/3829 |
| 2020/0250168 A1* | 8/2020 | Xu | G06F 16/2336 |
| 2021/0406877 A1* | 12/2021 | Wu | G06Q 20/4014 |

FOREIGN PATENT DOCUMENTS

| | | |
|---|---|---|
| CN | 108229958 A | 6/2018 |
| CN | 108876370 A | 11/2018 |
| CN | 109087204 A | 12/2018 |
| CN | 110008686 A | 7/2019 |
| CN | 110266655 A | 9/2019 |
| CN | 110288344 A | 9/2019 |
| CN | 111130808 A | 5/2020 |
| CN | 111311209 A | 6/2020 |
| WO | 2019014954 A1 | 1/2019 |

OTHER PUBLICATIONS

The World Intellectual Property Organization (WIPO) International Search Report for PCT/CN2020/124650 Jan. 27, 2021 6 Pages (including translation).

* cited by examiner

CROSS-BLOCKCHAIN DATA PROCESSING METHOD AND APPARATUS, DEVICE, AND COMPUTER STORAGE MEDIUM

RELATED APPLICATION(S)

This application is a continuation application of PCT Patent Application No. PCT/CN2020/124650 filed on Oct. 29, 2020, which claims priority to Chinese Patent Application No. 202010079180.2, entitled "CROSS-BLOCKCHAIN DATA PROCESSING METHOD AND APPARATUS, DEVICE, AND COMPUTER STORAGE MEDIUM" and filed with the China National Intellectual Property Administration on Feb. 3, 2020, all of which are incorporated herein by reference in entirety.

FIELD OF THE TECHNOLOGY

The present disclosure relates to the field of blockchain technologies, and particularly, to a cross-blockchain data processing method and apparatus, a device, and a computer storage medium.

BACKGROUND

At least due to the difference between implementations of different blockchains, a cross-blockchain data processing process between different blockchains may rely on a third-party intermediary recognized by both parties to transfer data. Cross-blockchain asset transfer may not readily be performed between different blockchains. The assets herein may include electronic resource data such as electronic money and electronic bills.

For example, when a first user on a blockchain A requests to transfer electronic resource data to a second user on a blockchain B, the first user may first transmit the electronic resource data to a third-party intermediary commonly recognized by the blockchain A and the blockchain B, so that the third-party intermediary notifies the second user of the electronic resource data. In this implementation, the second user can extract the converted electronic resource data from the third-party intermediary.

SUMMARY

In one aspect, the present disclosure provides a cross-blockchain data processing method, performed by a first server node on a first blockchain, the method including: obtaining an asset transfer instruction triggered for a first asset on the first blockchain, and configuring an asset state of the first asset to a locked state on the first blockchain; determining the first asset in the locked state as an asset, and determining a cross-chain asset transfer request corresponding to the asset, the cross-chain asset transfer request carrying system signature information associated with a first private key of the first server node; obtaining an asset transfer interface associated with a second blockchain, and calling the asset transfer interface to transmit the cross-chain asset transfer request to a second server node on the second blockchain, so that the second server node verifies the system signature information according to a first public key of the first server node; and receiving signing response information transmitted by the second server node in response to determining that the verification succeeds, freezing the asset on the first blockchain according to the signing response information, and notifying the second server node to release a second asset associated with the asset on the second blockchain.

In another aspect, the present disclosure provides a cross-blockchain data processing apparatus, applied to a first server node on a first blockchain, the apparatus including: a memory storing computer program instructions; and a processor coupled to the memory and configured to execute the computer program instructions and perform: obtaining an asset transfer instruction triggered by a first user for a first asset on the first blockchain, and configure an asset state of the first asset to a locked state on the first blockchain; determining the first asset in the locked state as an asset, and determining a cross-chain asset transfer request corresponding to the asset, the cross-chain asset transfer request carrying system signature information associated with a first private key of the first server node; obtaining an asset transfer interface associated with a second blockchain, and call the asset transfer interface to transmit the cross-chain asset transfer request to a second server node on the second blockchain, so that the second server node verifies the system signature information according to a first public key of the first server node; and receiving signing response information transmitted by the second server node in response to determining that the verification succeeds, freeze the asset on the first blockchain according to the signing response information, and notify the second server node to release a second asset associated with the asset on the second blockchain.

In yet another aspect, the present disclosure provides a non-transitory computer-readable storage medium storing computer program instructions executable by at least one processor of a first server node on a first blockchain to perform: obtaining an asset transfer instruction triggered by a first user for a first asset on the first blockchain, and configure an asset state of the first asset to a locked state on the first blockchain; determining the first asset in the locked state as an asset, and determining a cross-chain asset transfer request corresponding to the asset, the cross-chain asset transfer request carrying system signature information associated with a first private key of the first server node; obtaining an asset transfer interface associated with a second blockchain, and call the asset transfer interface to transmit the cross-chain asset transfer request to a second server node on the second blockchain, so that the second server node verifies the system signature information according to a first public key of the first server node; and receiving signing response information transmitted by the second server node in response to determining that the verification succeeds, freeze the asset on the first blockchain according to the signing response information, and notify the second server node to release a second asset associated with the asset on the second blockchain.

In yet another aspect, the present disclosure provides a cross-blockchain data processing method, performed by a second server node on a second blockchain, the method including: obtaining a cross-chain transfer request transmitted by a first server node on a first blockchain through an asset transfer interface, the cross-chain asset transfer request carrying system signature information associated with a first private key of the first server node and an asset, the system signature information being determined by the first server node according to an obtained asset transfer instruction of a first asset, the asset being the first asset in a locked state, and the asset transfer instruction being used for instructing the first server node to configure an asset state of the first asset to the locked state on the first blockchain; extracting the system signature information from the cross-chain asset transfer request, verifying the system signature information according to a first public key of the first server node, and generating signing response information for the first asset in response to determining that the verification succeeds; transmitting the signing response information to the first server node, so that the first server node freezes the asset on the first blockchain according to the signing response information; and receiving an asset release notification transmitted by the first server node in response to determining that the freezing is performed, and releasing a second asset associated with the asset on the second blockchain according to the asset release notification.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiment(s)" or "certain embodiment(s)" describe subsets of all possible embodiments, but it may be understood that the "some embodiment(s)" or "certain embodiment(s)" may be the same subset or different subsets of all the possible embodiments, and can be combined with each other without conflict.

In certain embodiments, the term "based on" is employed herein interchangeably with the term "according to."

The embodiments of the present disclosure involve blockchains. A blockchain is a set of decentralized infrastructure with distributed storage characteristics, and is a data structure formed by data blocks in a chronological order in a manner similar to a linked list, which can safely store data that has a sequence and can be verified in a system, and cryptographically ensure that the data cannot be tampered with and cannot be forged.

At present, the entire process of cross-chain asset transfer relies on third-party intermediaries for transfer, which reduces the efficiency of asset transfer. In addition, the process of cross-chain asset transfer is inevitably limited by credit problems of third-party intermediary organizations, thereby reducing the security of cross-chain asset transfer.

In view of this, the embodiments of the present disclosure provide a cross-blockchain data processing method and apparatus, a device, and a computer storage medium, which can improve the security and efficiency of cross-chain asset transfer.

Figure 1:
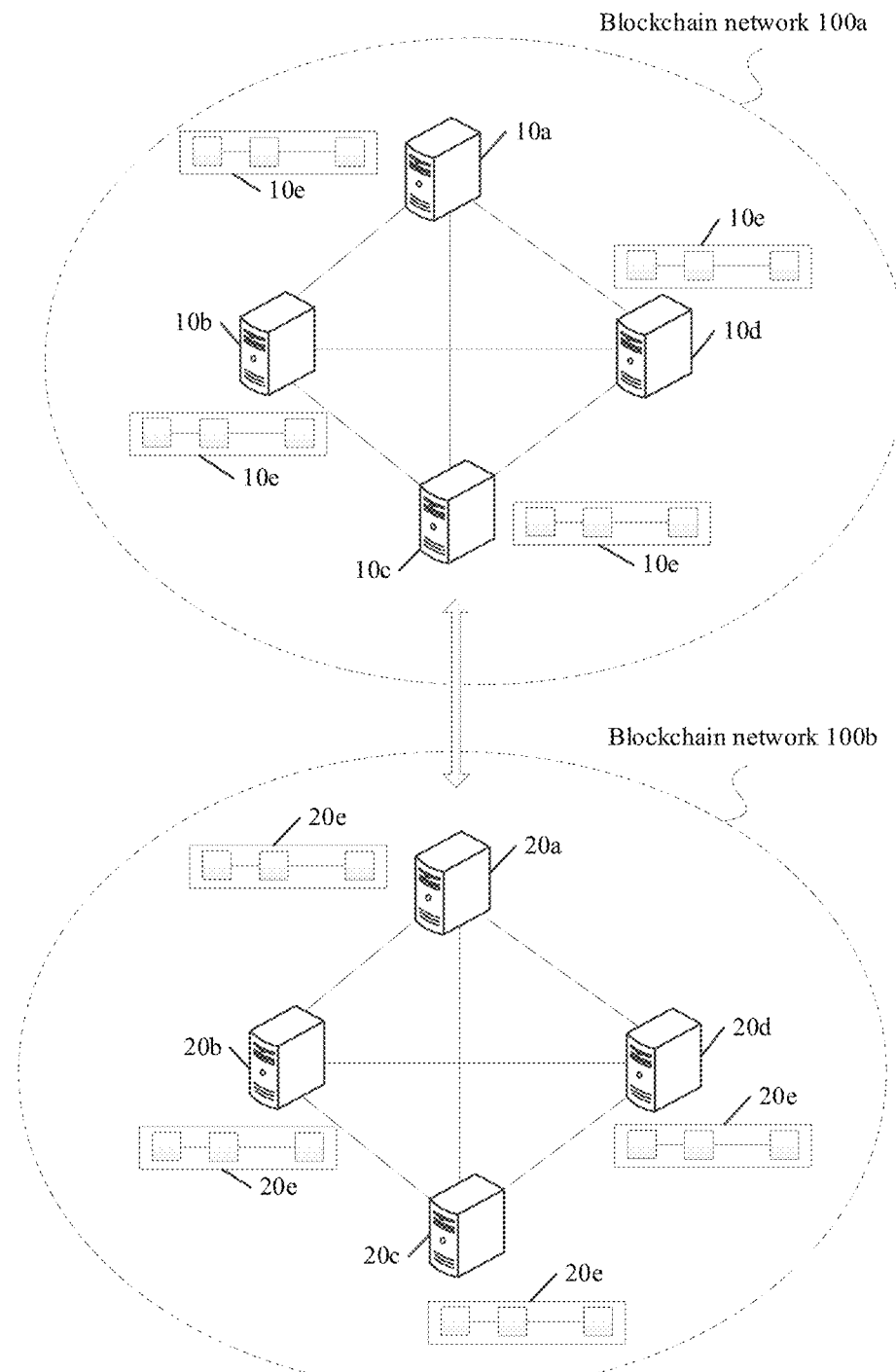
FIG. 1 is a schematic diagram of a system architecture of a blockchain network according to embodiment(s) of the present disclosure.

FIG. 1 is a schematic diagram of a system architecture of a blockchain network according to an embodiment of the present disclosure. As shown in FIG. 1, the system architecture may include a node device 10a, a node device 10b, a node device 10c, and a node device 10d shown in FIG. 1. The node device 10a, the node device 10b, the node device 10c, and the node device 10d are all blockchain nodes (referred to as nodes for short) in a blockchain network 100a shown in FIG. 1, and the nodes may be computing devices in any form that are connected to the blockchain network 100a, such as servers and user terminals. The nodes in the blockchain network 100a (that is, the node device 10a, the node device 10b, the node device 10c, and the node device 10d) may alternatively be connected in the form of network communication to form the blockchain network 100a shown in FIG. 1. A blockchain corresponding to the blockchain network 100a may be referred to as a first blockchain.

As shown in FIG. 1, the system architecture may further include a node device 20a, a node device 20b, a node device 20c, and a node device 20d shown in FIG. 1. The node device 20a, the node device 20b, the node device 20c, and the node device 20d are all blockchain nodes (referred to as nodes for short) in a blockchain network 100b shown in FIG. 1, and the nodes may include computing devices in any form that are connected to the blockchain network 100b, such as servers and user terminals. In this implementation, the nodes (that is, the node device 20a, the node device 20b, the node device 20c, and the node device 20d) may be connected in the form of network communication to form the blockchain network 100b shown in FIG. 1. A blockchain corresponding to the blockchain network 100b may be referred to as a second blockchain.

In certain embodiment(s), the nodes in the system architecture may form a peer-to-peer (P2P) network shown in FIG. 1, where a P2P protocol herein may be an application layer protocol running on top of a transmission control protocol (TCP). In the system architecture corresponding to the blockchain network 100b and the blockchain network 100a, any machine such as a server or a terminal may be added and become a node. The nodes may include a hardware layer, an intermediate layer, an operating system layer, and an application layer.

In certain embodiment(s), the blockchain network 100a described in this embodiment of the present disclosure may be a blockchain network different from the blockchain network 100b. For ease of understanding, in this embodiment of the present disclosure, the node devices in the blockchain network 100a are collectively referred to as first nodes, and the node devices in the blockchain network 100b are collectively referred to as second nodes. In certain embodiment(s), each first node in the blockchain network 100a may be used to maintain a same blockchain ledger (that is, a blockchain ledger 10e shown in FIG. 1). A plurality of smart contracts may be pre-deployed on the blockchain corresponding to the blockchain ledger 10e (that is, the first blockchain). For example, smart contracts with different data processing functions such as agency contracts, permission management contracts, service contracts, data contracts, and agency management contracts may be pre-deployed. Similarly, each second node in the blockchain network 100b may be used to maintain a same blockchain ledger (that is, a blockchain ledger 20e shown in FIG. 1). A plurality of smart contracts may also be deployed on the blockchain corresponding to the blockchain ledger 20e (for example, the second blockchain), and details are not described herein again.

In certain embodiment(s), when a cross-chain interaction is performed, blockchains involved in the cross-chain interaction may be divided into homogeneous chains and heterogeneous chains according to a difference in underlying technology platforms of blockchains spanned in the cross-chain interaction.

The security mechanism, consensus algorithm, network topology, block generation, and verification logic between homogeneous chains are basically the same. Therefore, cross-chain interactions between homogeneous chains are relatively easy, that is, during cross-chain asset interactions between homogeneous chains, asset transfer can be carried out directly through a corresponding asset transfer interface.

Due to the different underlying technology platforms of the heterogeneous chains, the cross-chain interactions of the heterogeneous chains are relatively complex. For example, a blockchain 1 corresponding to some nodes in a consortium chain may use a proof of work (PoW) algorithm, while a blockchain 2 corresponding to some other nodes in the consortium chain may use a traditional deterministic consensus algorithm. When cross-chain asset transfer is performed on the two blockchains, considering the differences in the composition of blocks and a deterministic guarantee mechanism, in this embodiment of the present disclosure, a corresponding smart contract may be called for asset conversion. For example, according to a smart contract that has been written on the second blockchain, a first asset on the first blockchain may be converted into a second asset. As can be seen, to avoid the security and efficiency problems of cross-chain interaction caused by the participation of third-party intermediaries, in this embodiment of the present disclosure, a unified access interface is established on a blockchain (one unified access interface may correspond to a plurality of transfer interfaces, which can ensure load balance), and a transfer interface (that is, an asset transfer interface) associated with the unified access interface is directly called for cross-chain asset transfer when cross-chain interaction is desirable, thereby improving the efficiency and security of cross-chain asset transfer.

The system architecture of this embodiment of the present disclosure may be applied to a cross-blockchain data processing system, and the cross-blockchain data processing system may include a blockchain electronic bill system (referred to as an electronic bill system for short), a blockchain electronic asset transfer system, or the like. The specific implementation scenarios are not limited herein.

The types of blockchains involved in the system architecture shown in FIG. 1 may include: a public blockchain, a private blockchain, and a consortium blockchain. A public chain refers to a blockchain that may be made public, and may be joined in and accessed by anyone. Blocks on the public chain may be viewed by anyone, and anyone may initiate transactions on the public chain and participate in a consensus process of the public chain at any time. A private chain may be used inside a private organization, and read and write permissions and a permission to participate in accounting on the private chain may be formulated according to rules of the private organization. The private chain is generally used for data management and auditing inside an enterprise. A consortium chain means that read and write permissions and a permission to participate in accounting of consortium members participating in the consortium chain may be formulated according to consortium rules. The consortium chain is generally used in scenarios such as inter-institutional transactions, settlement or clearing.

In certain embodiment(s), two different types of blockchains may have respective management implementations. For example, a consensus mechanism in a public chain is generally PoW or proof of stake (PoS), while a consensus mechanism in a consortium chain is generally proof of rights or a consensus algorithm such as practical byzantine fault tolerant (PBFT) or RAFT (a consensus algorithm). In certain embodiment(s), two blockchains of the same type also have different management implementations. For example, a consensus mechanism of one consortium chain may be proof of rights, while a consensus mechanism of the other consortium chain may be the PBFT consensus mechanism.

Figure 2:
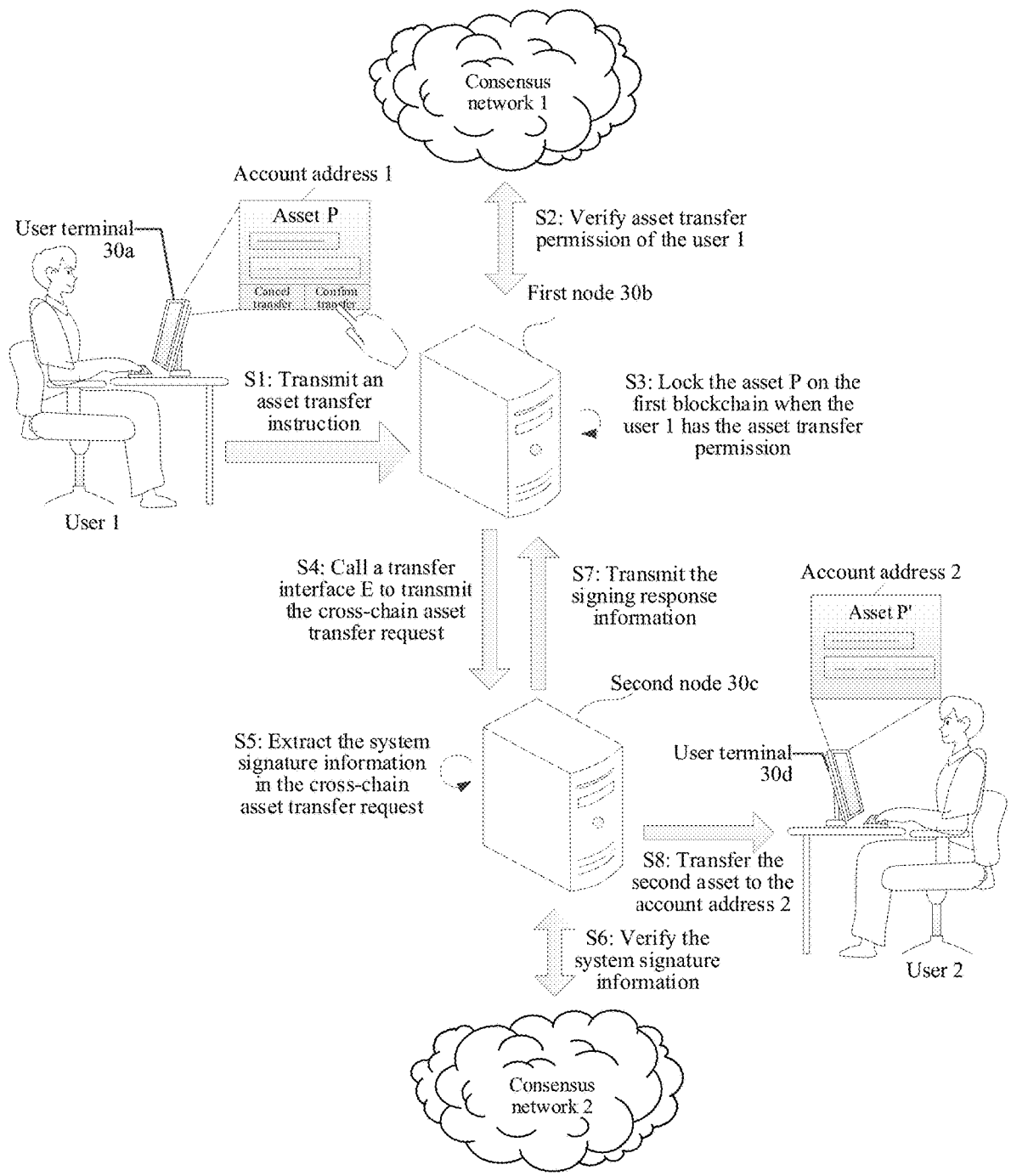
FIG. 2 is a schematic diagram of a cross-chain interaction scenario according to embodiment(s) of the present disclosure.

For ease of understanding, further, FIG. 2 is a schematic diagram of a cross-chain interaction scenario according to an embodiment of the present disclosure. As shown in FIG. 2, a user 1 may perform a transfer operation on an asset P on a first blockchain (for example, the blockchain corresponding to the blockchain network 100a) on a user terminal 30a shown in FIG. 2. The transfer operation may include a contact operation, for example, a click operation. In this embodiment of the present disclosure, the transfer operation may further include a non-contact operation, such as a gesture operation or voice. The specific transfer operation performed by the user 1 is not limited herein. For ease of understanding, in this embodiment of the present disclosure, the first blockchain being one of the consortium chains is taken as an example to illustrate a specific process of cross-chain asset transfer on different blockchains.

The asset P may include, but is not limited to: virtual digital assets (for example, game coins, golden beans, and mall points), electronic bills (for example, electronic invoices and financial invoices), electronic money (for example, bitcoins and ethers), and the like. In certain embodiment(s), the asset P may be an asset under an account address 1 (that is, a first account address) of the user 1 (that is, a first user) shown in FIG. 2. To distinguish the asset P under the account address 1 of the user 1 from an asset P' under an account address 2 (that is, a second account address) of a subsequent user 2 (that is, a second user), in this embodiment of the present disclosure, the asset P under the account address 1 is referred to as a first asset, and the asset P' under the account address 2 is referred to as a second asset.

The asset type of the second asset may be the same as the asset type of the first asset. In this embodiment of the present disclosure, the asset type of the second asset may alternatively be different from the asset type of the first asset, and this is not limited herein. In certain embodiment(s), whether the asset types of the first asset and the second asset in this embodiment of the present disclosure are the same depends on whether the blockchain types of the first blockchain and the second blockchain are the same, which may be equivalently as whether an underlying blockchain technology used to build the first blockchain is the same as an underlying blockchain technology used to build the second blockchain.

As shown in FIG. 2, after obtaining a transfer operation performed by the user 1 (that is, the first user) on an operation interface to which the asset P belongs, the user terminal 30*a* may perform step S1 shown in FIG. 2, to transmit an asset transfer instruction to a first server node (that is, a node 30*b* shown in FIG. 2) on the first blockchain. As shown in FIG. 2, after obtaining the asset transfer instruction, the first node 30*b* may extract user signature information of the user 1 carried in the asset transfer instruction, where the user signature information is obtained after the asset P is signed by the user terminal 30*a* by using a private key of the user 1.

As shown in FIG. 2, to determine whether the user 1 has an asset transfer permission for the asset P, the first node 30*b* may generate a pre-transfer request according to the user signature information, the asset P, and a public key of the user 1, to transmit the pre-transfer request to other first nodes in a consensus network 1 shown in FIG. 2, so that other first nodes may verify the user signature information according to the public key of the user 1. In certain embodiment(s), the first node 30*b* may determine that the user 1 has the permission to transfer the asset P when or in response to determining that the verification succeeds, so that step S3 shown in FIG. 2 may be performed to lock the asset P on the first blockchain.

As shown in FIG. 2, after the first node 30*b* performs the locking of the asset P, a cross-chain transfer request for the asset P may be generated, and then step S4 may be performed. That is, a transfer interface E on the second blockchain may be called to transmit the cross-chain asset transfer request to a second server node (that is, a second node 30*c* shown in FIG. 2) on the second blockchain to which the user 2 belongs. The cross-chain asset transfer request may carry system signature information associated with a first private key of the first node 30*b* and a first public key of the first node 30*b*. Therefore, as shown in FIG. 2, the second node 30*c* may extract the system signature information from the cross-chain asset transfer request, and may broadcast the system signature information and the first public key to a consensus network 2 shown in FIG. 2. In this way, a plurality of second nodes in the consensus network 2 may perform step S6 shown in FIG. 2, that is, the second nodes may verify the system signature information according to the first public key.

As shown in FIG. 2, when or in response to determining that the verification succeeds, the second node 30*c* may determine the authenticity and reliability of obtained data in the cross-chain asset transfer request, and then may perform step S7 shown in FIG. 2, that is, return to the first node 30*b* signing response information agreeing to sign the asset P. In certain embodiment(s), the first node 30*b* may freeze the asset P on the blockchain after obtaining the signing response information, for example, may change the asset state of the asset P in the locked state to a frozen state, to transfer the asset P in the locked state to a recovery address on the first blockchain, so that the asset P may be destroyed on the first blockchain. Moreover, after freezing the asset P, the first node 30*b* may notify the second node 30*c* to generate the asset P' that maps to the asset P on the second blockchain, that is, the second asset associated with the first asset may be released on the second blockchain. As shown in FIG. 2, the second node 30*c* may further perform step S8 shown in FIG. 2 to transfer the released second asset to the account address 2 (that is, the second account address) shown in FIG. 2. In this implementation, the user 2 may display the asset P' under the account address 2 on a display interface corresponding to the asset P' shown in FIG. 2. In certain embodiment(s), after performing the cross-chain asset transfer, the second node 30*c* may further return feedback information (that is, transfer feedback information) to the first node 30*b* shown in FIG. 2, to represent that the cross-chain interaction between different blockchains is performed at present.

In certain embodiment(s), when the second node 30*c* obtains the cross-chain asset transfer request, it is recognized that the asset type of the asset P is different from the asset type associated with the second blockchain, for example, the asset type of the asset P (for example, bitcoins) on the first blockchain is different from the asset type of ethers on the second blockchain. In this implementation, a smart contract on the second node 30*c* (for example, a service contract used to convert the asset P to the asset P') may be called to perform asset conversion on the asset P before releasing the corresponding quantity of ethers (that is, the asset P'), to obtain an asset quantity 2 of the asset P' that has the same value as an asset quantity 1 of the asset P. In other words, the second node 30*c* may convert assets of different asset types according to asset transfer processing rules in the smart contract to obtain the asset P' shown in FIG. 2.

The first blockchain and the second blockchain may be two different types of blockchains. For example, the first blockchain may be a private chain, and the second blockchain may be a consortium chain. In this embodiment of the present disclosure, the first blockchain and the second blockchain may alternatively be the same type of blockchain. For example, the first blockchain may be a consortium chain, and the second blockchain may also be a consortium chain.

In this embodiment of the present disclosure, the first node 30*b* may also have the smart contract in the second node 30*c*, so that when receiving a new cross-chain asset transfer request transmitted by the second blockchain, the first node 30*b* may reversely convert the second asset on the second blockchain to the first asset on the first blockchain according to the asset transfer processing rules. For example, when the user 2 may reversely transfer a specific quantity of ethers (that is, a new first asset) on the second blockchain to the user 1 on the first blockchain, a new cross-chain asset transfer request may also be transmitted to the first node 30b through the second node 30c. The new cross-chain asset transfer request may be used to request the first node 30b to release a second asset associated with the new first asset on the first blockchain. In other words, the first node 30b may call the smart contract in the first node 30b to perform asset conversion according to the new first asset carried in the cross-chain asset transfer request, to obtain a corresponding quantity of bitcoins (that is, the new second asset).

In certain embodiment(s), the smart contract deployed on the first blockchain and the smart contract deployed on the second blockchain refer to decentralized, information-sharing program code running in node devices on the corresponding blockchains. In certain embodiment(s), when the parties that sign the contract reach an agreement on the content of the contract, the smart contracts may be deployed in the node devices on the corresponding blockchains. In this way, when it is detected that a trigger condition for triggering the smart contracts is met (for example, when the cross-chain asset transfer request is obtained as described above), the smart contracts may be automatically executed on behalf of the parties without relying on any central institution.

For ease of understanding, in this embodiment of the present disclosure, the smart contract running in the first node on the first blockchain may be referred to as a first smart contract, and the smart contract running in the second node on the second blockchain may be referred to as a second smart contract. There may be a corresponding asset mapping relationship between the first smart contract and the second smart contract (for example, an exchange rate conversion relationship, or a data structure mapping relationship). The asset transfer processing rules refer to asset conversion rules jointly recognized and followed by the user on the first blockchain and the user on the second blockchain. The first smart contract is formed after compiling the resource transfer processing rules according to implementations of the first blockchain, and the first smart contract may run on each first node of the first blockchain (for example, the node 10a to the node 10d shown in FIG. 1). The second smart contract is formed after compiling the resource transfer processing rules according to implementations of the second blockchain, and the second smart contract may run on each second node of the second blockchain (for example, the node 20a to the node 20d shown in FIG. 1).

For the specific process in which the first node 30b locks the first asset, transmits the cross-chain asset transfer request to the second node 30c through the asset transfer interface, and freezes the first asset according to the signing response information, reference may be made to embodiments corresponding to FIG. 3 to FIG. 8.

Figure 3:
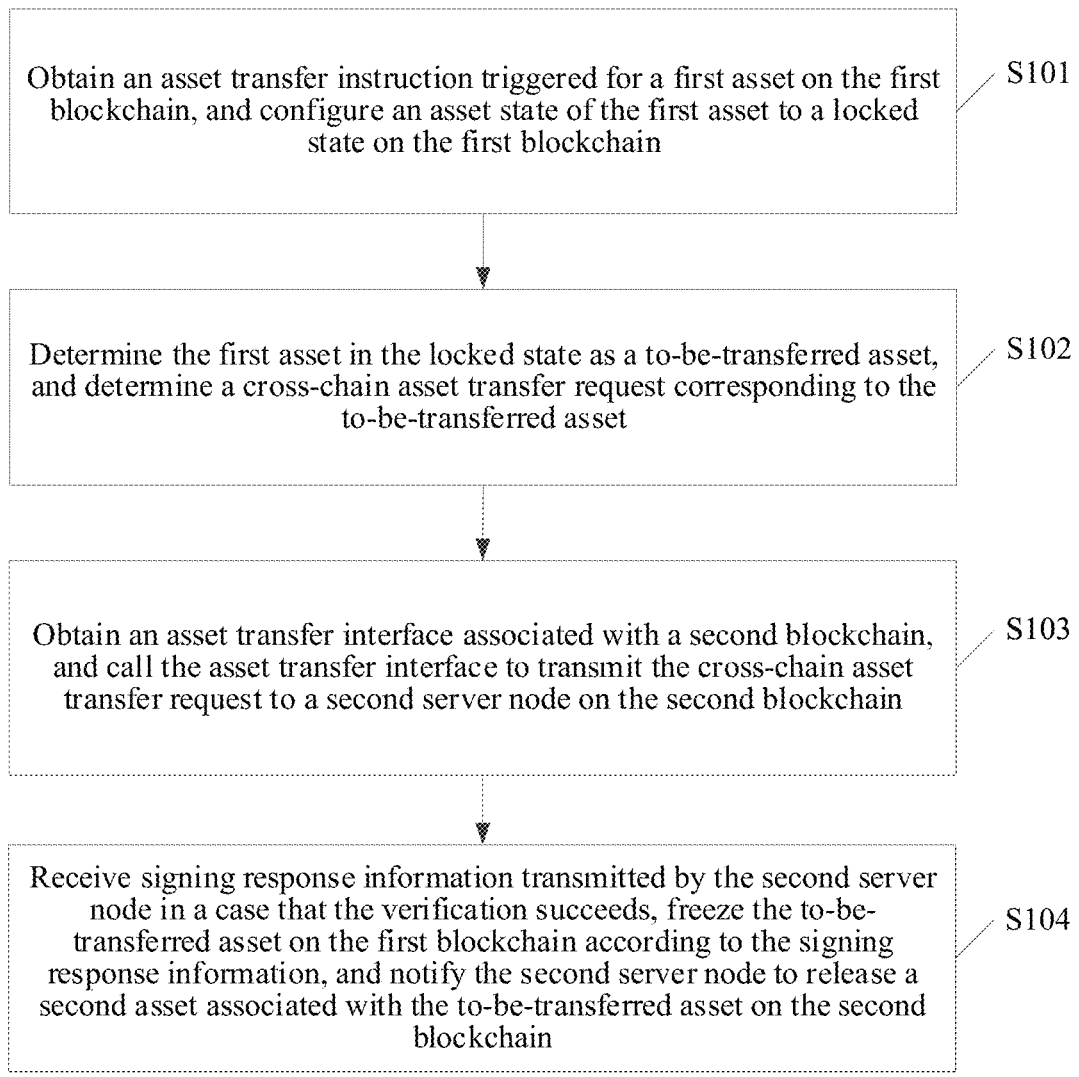
FIG. 3 is a flowchart of a cross-blockchain data processing method according to embodiment(s) of the present disclosure.

Further, FIG. 3 is a flowchart of a cross-blockchain data processing method according to an embodiment of the present disclosure. The method may be performed by a first server node on a first blockchain. The first server node may be any node device (for example, the node device 10c) in the blockchain network 100a shown in FIG. 1. As shown in FIG. 3, the method may further include the following steps S101 to S104:

Step S101: Obtain an asset transfer instruction triggered for a first asset on the first blockchain, and configure an asset state of the first asset to a locked state on the first blockchain.

In certain embodiment(s), the first server node may determine the asset transfer instruction associated with the first asset in response to an asset transfer operation triggered by a first user for the first asset on the first blockchain. The asset transfer instruction may carry user signature information associated with the first user. The user signature information is obtained after the first asset is signed by using a private key of the first user. Further, the first server node may generate a pre-transfer request according to the user signature information carried in the asset transfer instruction, the first asset, and a public key of the first user, and may broadcast the pre-transfer request to $M_1$ consensus nodes on the first blockchain, so that the $M_1$ consensus nodes may verify, based on the pre-transfer request, whether the first user has asset transfer permission to transfer the first asset. $M_1$ is a positive integer greater than 2. Further, the first server node may configure the asset state of the first asset to the locked state on the first blockchain when or in response to determining that it is determined that the first user has the asset transfer permission to transfer the first asset.

In certain embodiment(s), virtual assets (referred to as assets for short) that may be transferred across chains in the embodiments of the present disclosure may include electronic asset data such as electronic bills, electronic money, and virtual digital assets. For ease of understanding, in this embodiment of the present disclosure, an example in which the virtual assets that may be transferred between different blockchains (that is, the first blockchain and the second blockchain) are electronic bills is taken to illustrate the specific process of cross-chain transfer of electronic bills through the asset transfer interface.

Figure 4:
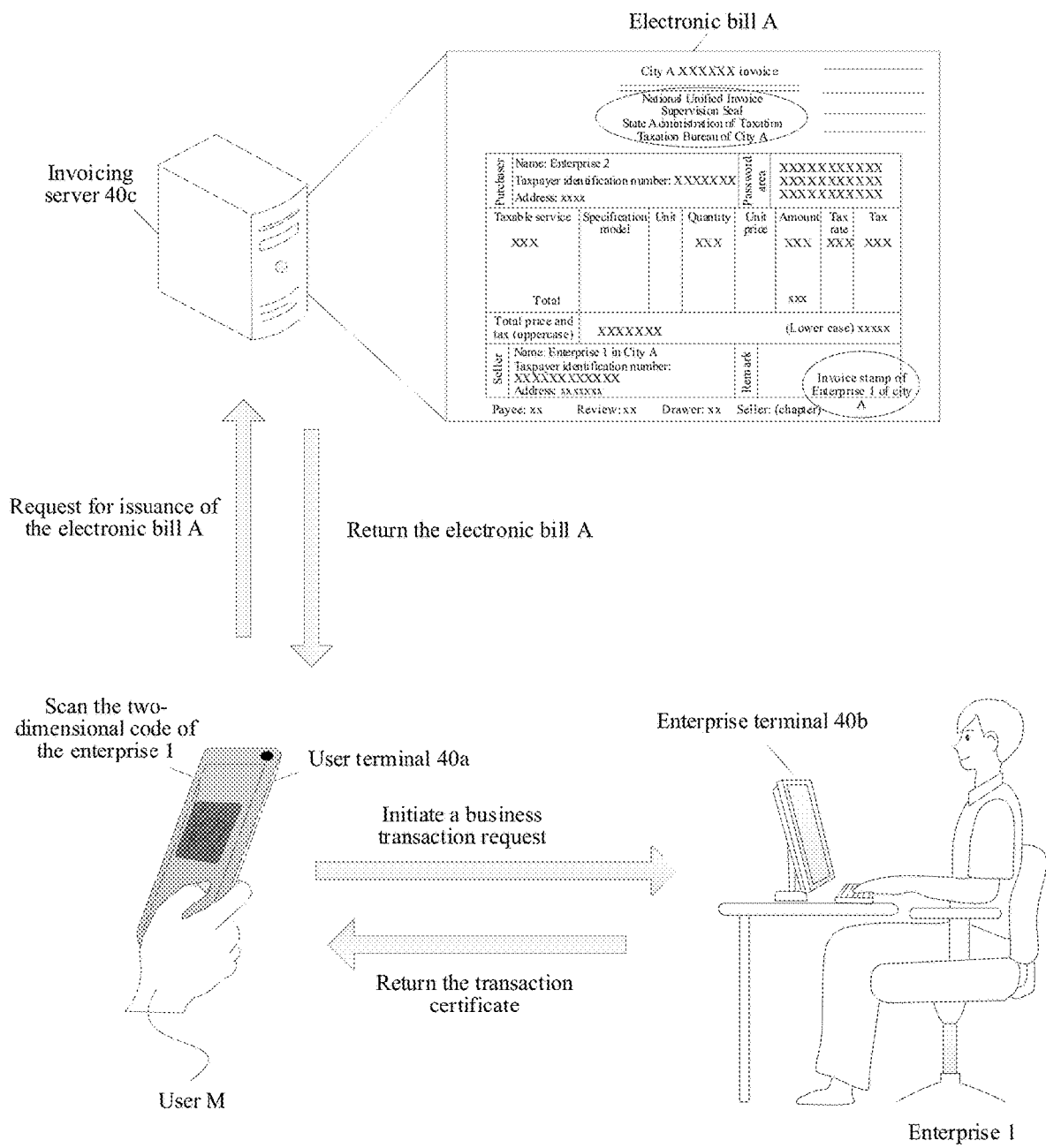
FIG. 4 is a schematic diagram of a scenario of obtaining an electronic bill according to embodiment(s) of the present disclosure.

Further, FIG. 4 is a schematic diagram of a scenario of obtaining an electronic bill according to an embodiment of the present disclosure. When there is a service transaction between a user M shown in FIG. 4 (that is, a first user) and an enterprise in a city A (for example, an enterprise 1 shown in FIG. 4), a target application (for example, WeChat) in a user terminal 40a (that is, a user terminal corresponding to the user M) shown in FIG. 4 may be used to call a camera built in the user terminal 40a to scan a two-dimensional code (for example, a collection code of the enterprise 1) provided by the enterprise 1, to initiate a service transaction request shown in FIG. 4 to the enterprise 1. In this implementation, an enterprise terminal 40b shown in FIG. 4 (that is, a user terminal corresponding to the enterprise 1) may generate a corresponding transaction voucher after confirming transaction information requested in the service transaction request, and may return the transaction voucher to the user terminal 40a shown in FIG. 4. In certain embodiment(s), the transaction voucher in this embodiment of the present disclosure may carry an invoicing service interface of an invoicing service provider (for example, an invoicing user corresponding to an invoicing server 40c shown in FIG. 4) associated with the enterprise 1. In this way, when the user M may issue an electronic bill corresponding to the current service transaction, the user M may initiate an invoice request for issuing the electronic bill A to the server (that is, the invoicing server 40c) corresponding to the invoicing server provider in the city A through the invoicing service interface. As shown in FIG. 4, the invoicing server 40c may generate the electronic bill A shown in FIG. 4 based on key service information (for example, key bill information such as buyer information and seller information) carried in the invoicing request transmitted by the user terminal 40a.

In certain embodiment(s), when the electronic bill A flows from an invoicing address (a blockchain address 1) of the invoicing server 40c to a personal address of the user M (for example, a blockchain address 2), it means that the invoicing server 40c may return the electronic bill A (for example, an electronic bill in PDF format) to the user terminal 40a shown in FIG. 4. Both the blockchain address 1 and the blockchain address 2 are account addresses on the first blockchain, where the blockchain address 2 may be the first account address of the first user. In certain embodiment(s), the user terminal 40a may obtain the electronic bill A from the blockchain address 2 and store the electronic bill A in the target application. For example, the electronic bill A may be stored in the personal account (for example, a WeChat package) of the user M, so that the user may subsequently reimburse the electronic bill A stored in the WeChat package.

In certain embodiment(s), when the invoicing server 40c releases (that is, issues) the electronic bill A shown in FIG. 4 on the first blockchain, an invoicing transaction record associated with the electronic bill A may be uploaded to the tax chain (that is, the first blockchain) associated with the invoicing server 40c, so that a tax bureau of the city A may conduct risk audits and security supervision of the electronic bill A on the first blockchain. In certain embodiment(s), due to different blockchain developers selected by tax bureaus in different geographic regions, underlying blockchain technologies used in the geographic regions are different, and tax chains constructed in the geographic regions are also different.

For example, if an underlying blockchain technology adopted by a blockchain developer 1 in the city A is an X1 technology, and an underlying blockchain technology adopted by a blockchain developer 2 in a city B is an X2 technology, a tax chain 1 (that is, the first blockchain) built by the blockchain developer 1 for the city A may be different from a tax chain 2 (that is, the second blockchain) built by the blockchain developer 2 for the city B. In certain embodiment(s), the invoicing server 40c may be a node device on the tax chain 1, and the tax chain 1 may further include node devices corresponding to other invoicing service providers. In certain embodiment(s), one invoicing service provider may perform invoicing services on behalf of one or more enterprises, and this is not limited herein.

Figure 5:
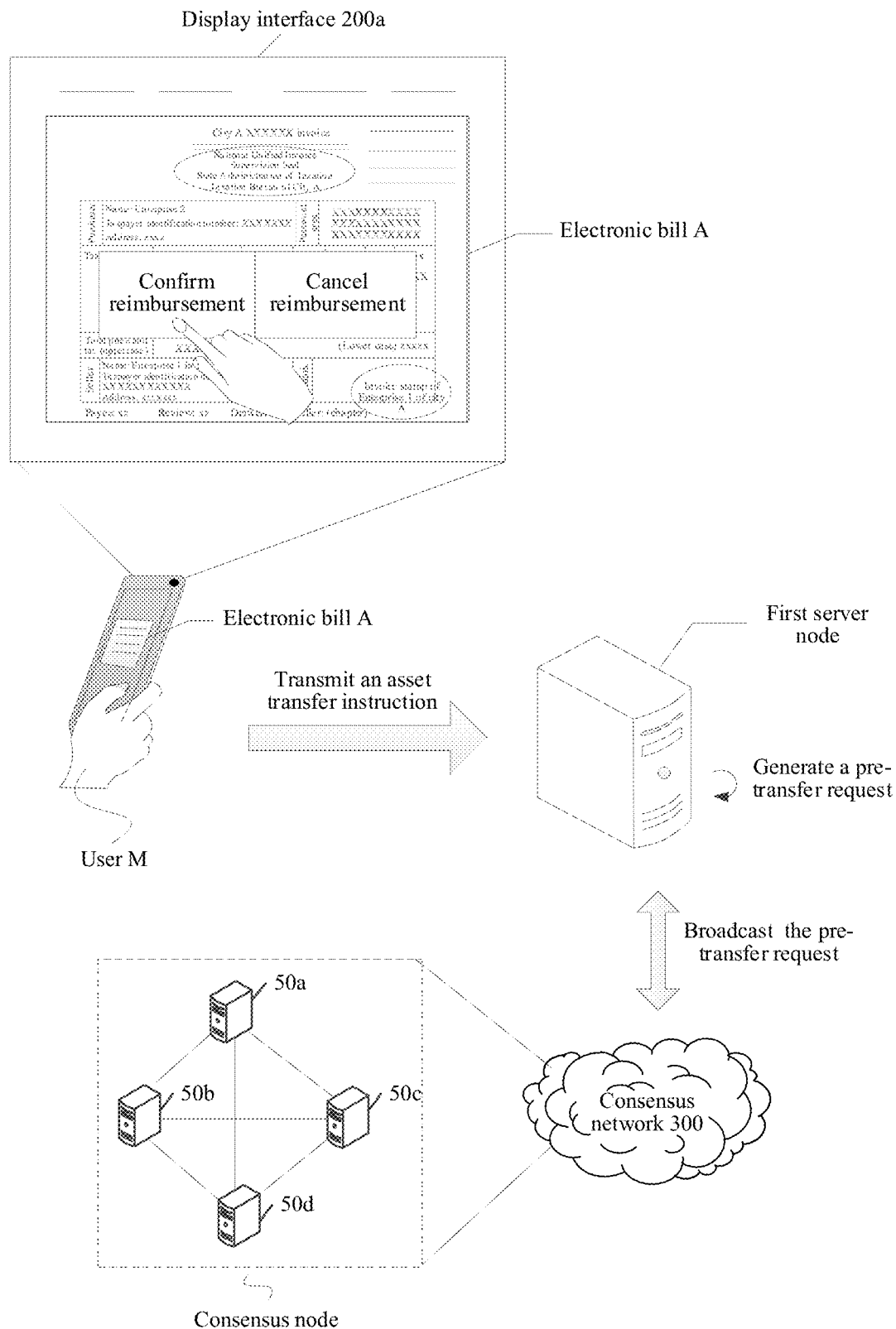
FIG. 5 is a schematic diagram of a scenario of generating a pre-transfer request according to embodiment(s) of the present disclosure.

For ease of understanding, further, FIG. 5 is a schematic diagram of a scenario of generating a pre-transfer request according to an embodiment of the present disclosure. As shown in FIG. 5, when the user M may reimburse the electronic bill A to an enterprise in city B (for example, an enterprise 2, where the user M is an employee of the enterprise 2), the user M may lock the electronic bill A (that is, the first asset) on the first blockchain.

For example, the user M may perform an asset transfer operation (the asset transfer operation herein may be a trigger operation performed on a "confirm reimbursement" button shown in FIG. 5) on the electronic bill A (that is, the electronic bill A in a display interface 200a shown in FIG. 5) in the WeChat package in the user terminal 40a, to transmit an asset transfer instruction to the node device (that is, the first server node shown in FIG. 5) on the first blockchain associated with the electronic bill A (the first asset). In certain embodiment(s), the first server node may be a node device corresponding to the tax bureau of the City A in the tax chain 1. For example, the first server node may be the node device 10a in the blockchain network 100a shown in FIG. 1.

In certain embodiment(s), before transmitting the asset transfer instruction, the user terminal 40a may use the private key of the user M (that is, the first user) to sign the electronic bill A (that is, the first asset), to obtain signature information associated with the first user. In this embodiment of the present disclosure, the signature information associated with the first user may be collectively referred to as user signature information. In other words, the asset transfer instruction may carry user signature information associated with the first user and the electronic bill A that may be transferred. Further, when obtaining the asset transfer instruction transmitted by the user terminal 40a, the first server node may generate a pre-transfer request shown in FIG. 5 according to the electronic bill A (the first asset), the user signature information, and the public key of the user M (that is, the first user), and transmit, according to routing information of $M_1$ consensus nodes on the first blockchain (that is, the tax chain 1) stored by the first server node, the pre-transfer request to the $M_1$ consensus nodes, so that the consensus nodes may perform consensus according to data information carried in the pre-transfer request, to determine whether the user M (that is, the first user) has the permission to transfer the electronic bill A (that is, the first asset). In this embodiment of the present disclosure, the permission of the first user to transfer the first asset may be referred to as the asset transfer permission.

The $M_1$ consensus nodes shown in FIG. 5 may include a node device 50a, a node device 50b, a node device 50c, and a node device 50d shown in FIG. 5. A network formed by the consensus nodes may be referred to as a consensus network (for example, a consensus network 300 shown in FIG. 5). In certain embodiment(s), when the nodes in the consensus network 300 receive the pre-transfer request, the nodes may verify the user signature information in the pre-transfer request according to the public key of the user M to ensure that the reliability of the user M who initiates the asset transfer instruction. In addition, the consensus nodes may further perform a hash calculation on the obtained electronic bill A (that is, the first asset) to obtain a hash value 1 of the first asset. Further, the calculated hash value 1 of the first asset is compared with a hash value 2 of the electronic bill A stored on the first blockchain, to ensure the authenticity and validity of the electronic bill A that the user M may transfer.

In certain embodiment(s), when a consensus result returned by the $M_1$ consensus nodes to the first server node indicates that the verification succeeds and the calculated hash value 1 is consistent with the hash value 2 stored on the chain, it may be determined that the first user has the permission to transfer the electronic bill A. Further, when it is determined that the user M (that is, the first user) has the asset transfer permission to transfer the electronic bill A (that is, the first asset), the asset state of the first asset is configured as a locked state on the tax chain 1 (that is, the first blockchain), so that the following step S102 may be further performed.

Step S102: Determine the first asset in the locked state as a to-be-transferred asset, and determine a cross-chain asset transfer request corresponding to the to-be-transferred asset, the cross-chain asset transfer request carrying system signature information associated with a first private key of the first server node;

In certain embodiment(s), the first server node may determine the first asset in the locked state as the to-be-transferred asset, and sign the user signature information and the to-be-transferred asset by using the first private key of the first server node, to obtain the system signature information associated with the to-be-transferred asset. Further, the first server node may generate the cross-chain asset transfer request corresponding to the to-be-transferred asset according to the system signature information, the user signature information, the to-be-transferred asset, and the first public key of the first server node.

In this embodiment of the present disclosure, electronic bills that may be transferred between the tax chain 1 and the tax chain 2 may be collectively referred to as to-be-transferred assets, and data exchanges between different blockchains may be collectively referred to as cross-chain asset transfer. In this embodiment of the present disclosure, a blockchain (for example, the tax chain 1) that transmits the cross-chain asset transfer request may be referred to as the first blockchain, and a blockchain (for example, the tax chain 2) used to receive the cross-chain asset transfer request may be referred to as the second blockchain. The second blockchain may include the node device corresponding to the tax bureau of the city B.

In certain embodiment(s), when the user M (the first user) is an employee of the enterprise (that is, the enterprise 2) of the city B, a local tax bureau corresponding to the enterprise 2 may be the tax bureau of the city B. Therefore, when the user M requests reimbursement to the enterprise 2 in the city B, the first asset on the first blockchain may be transferred to the second blockchain. Since the first blockchain is a blockchain different from the second blockchain, in this embodiment of the present disclosure, the asset transfer interface associated with the second blockchain may be quickly determined when a unified access interface on the second blockchain is obtained. In other words, in this embodiment of the present disclosure, data exchange is performed on different blockchains by calling the asset transfer interface, thereby reducing the complexity of cross-chain interaction, and enhancing the ease of use and efficiency of cross-chain interaction.

In certain embodiment(s), due to the different underlying blockchain technologies used by different blockchains, in order to improve the security of cross-chain interaction, in this embodiment of the present disclosure, the system signature information of the first server node may be attached in the process of generating the cross-chain asset transfer request, so that the second server node may subsequently determine whether the cross-chain asset transfer request comes from the first blockchain according to the system signature information. The system signature information is obtained after the user signature information and the to-be-transferred asset (that is, the first asset in the locked state) are signed by using the private key (that is, the first private key) of the first server node.

Step S103: Obtain an asset transfer interface associated with a second blockchain, and call the asset transfer interface to transmit the cross-chain asset transfer request to a second server node on the second blockchain, so that the second server node verifies the system signature information according to a first public key of the first server node.

In certain embodiment(s), the first server node may determine at least one transfer interface associated with a unified access interface on the second blockchain according to a communication mapping relationship between the first blockchain and the second blockchain, one transfer interface being corresponding to one server node on the second blockchain. Further, the first server node may determine the asset transfer interface for receiving the cross-chain asset transfer request in the at least one transfer interface, and determine a server node corresponding to the asset transfer interface as the second server node on the second blockchain. Further, the first server node may call the asset transfer interface to transmit the cross-chain asset transfer request to the second server node on the second blockchain.

In this embodiment of the present disclosure, the node device on the second blockchain that is used to receive the cross-chain asset transfer request may be referred to as the second server node. In certain embodiment(s), before the data exchange, the first blockchain and the second blockchain may agree on the corresponding communication protocol and communication implementation to construct a communication mapping relationship between the two blockchains. In other words, the first server node in this embodiment of the present disclosure may quickly determine the unified access interface on the second blockchain (that is, the tax chain 2) associated with the current tax chain 1 according to the communication mapping relationship between the first blockchain and the second blockchain, and may then obtain at least one transfer interface associated with the unified access interface.

In this embodiment of the present disclosure, one transfer interface may correspond to one node device (that is, one server node) on the second blockchain. In this embodiment of the present disclosure, a node device may be selected from the node devices as the second server node. In this embodiment of the present disclosure, an unoccupied duration (that is, an idle duration) of each node device among the node devices may be obtained, so that a transfer interface with an idle duration greater than a preset idle threshold may be used as an asset transfer interface, and a server node corresponding to the asset transfer interface may be referred to as the second server node. Therefore, when the user M reimburses the enterprise 2 in the city B, the first server node associated with the user M may transmit the cross-chain asset transfer request to the second server node by calling the asset transfer interface.

In certain embodiment(s), a blockchain address (for example, a blockchain address 3) of the enterprise 2 in the city B is on the second blockchain, and the blockchain address 2 of the user M is not on the second blockchain. Therefore, to enable cross-chain interaction, the second server node in this embodiment of the present disclosure may extract the system signature information from the cross-chain asset transfer request after obtaining the cross-chain asset transfer request, and may verify (that is, signature verification) the system signature information by using the first public key of the first server node broadcast to the second blockchain. In this way, when or in response to determining that the verification succeeds, the signing response information confirming the signing of the electronic bill A may be generated, and the signing response information may be returned to the first server node to further perform the following step S104.

Step S104: Receive signing response information transmitted by the second server node when or in response to determining that the verification succeeds, freeze the to-be-transferred asset on the first blockchain according to the signing response information, and notify the second server node to release a second asset associated with the to-be-transferred asset on the second blockchain.

In certain embodiment(s), the first server node may receive the signing response information transmitted by the second server node when or in response to determining that the verification succeeds, and change the asset state of the to-be-transferred asset to a frozen state on the first blockchain according to the signing response information. Further, the first server node may obtain an asset recovery address associated with the first blockchain, and add the to-be-transferred asset in the frozen state to the asset recovery address. Further, the first server node may notify the second server node to release the second asset associated with the to-be-transferred asset on the second blockchain.

In certain embodiment(s), when obtaining the signing response information, the first server may freeze the electronic bill A in the locked state. For example, the electronic bill A in the locked state may be changed to the frozen state. Further, the electronic bill A in the frozen state may be transferred to the recovery address on the first blockchain, so that the electronic bill A in the recovery address may be destroyed subsequently. In certain embodiment(s), the locked state of electronic bill A means that the current electronic bill A is in a to-be-reimbursed state. The frozen state of the electronic bill A means that the current electronic bill A is in a reimbursed state.

In this embodiment of the present disclosure, a lock duration (for example, 5 minutes) may be set for the electronic bill A when the electronic bill (that is, the electronic bill A) is locked, and the user M may determine whether to revoke the cross-chain transfer of the electronic bill A in the locked state within the lock duration. For example, when the user M performs a trigger operation on a "cancel reimbursement" button on the display interface 200a shown in FIG. 5 (that is, the user terminal 40a detects a reimbursement cancellation operation), the cross-chain transfer of the electronic bill A in the locked state may be revoked. In this way, the second server node may not release an electronic bill A' (that is, the second asset) with the same bill information content as the electronic bill A (that is, the first asset) on the second blockchain. Conversely, when the user terminal 40a does not detect the reimbursement cancellation operation performed by the user M within the lock duration, and the first server node has changed the bill state of the electronic bill A from the locked state to the frozen state, the second server node may release the electronic bill A' (that is, the second asset) with the same bill information content as the electronic bill A (that is, the first asset) on the second blockchain.

In this embodiment of the present disclosure, data communication between the first blockchain and the second blockchain can be implemented through the asset transfer interface on the second blockchain. In certain embodiment(s), the cross-chain transfer of the electronic bills involved in the embodiments of the present disclosure refers to releasing the new virtual asset on the second blockchain different from the first blockchain when the first asset is frozen on the first blockchain. The new virtual asset may be the second asset associated with the first asset.

In certain embodiment(s), although the electronic bill A and the electronic bill A' have the same bill information content, due to the different underlying blockchain technologies adopted by the tax chain 1 and the tax chain 2, for example, the tax chain 1 uses Go language to build a blockchain platform that runs one underlying blockchain technology and the tax chain 2 uses Java language to build a blockchain platform that runs another underlying blockchain technology, data structures stored in the corresponding blockchain ledgers are different. Therefore, when releasing a second asset with a different data structure from the first asset on the second blockchain, the second server node may call the smart contract on the second blockchain (that is, the service contract for asset conversion) to generate the second asset that has an asset mapping relationship with the first asset. In certain embodiment(s), in this embodiment of the present disclosure, the second asset that has the asset mapping relationship with the first asset may be quickly generated on the second blockchain by using the smart contract, without the participation of a third-party intermediary in the entire process, thereby ensuring the efficiency and security of releasing the second asset.

In this embodiment of the present disclosure, after performing step S104, the first server node may further perform the following step: obtaining transfer feedback information transmitted by the second server node for the second asset. The transfer feedback information may include the asset mapping relationship between the first asset and the second asset. The asset mapping relationship may be used for describing a conversion relationship between a first asset type of the first asset and a second asset type of the second asset during asset conversion.

Figure 6:
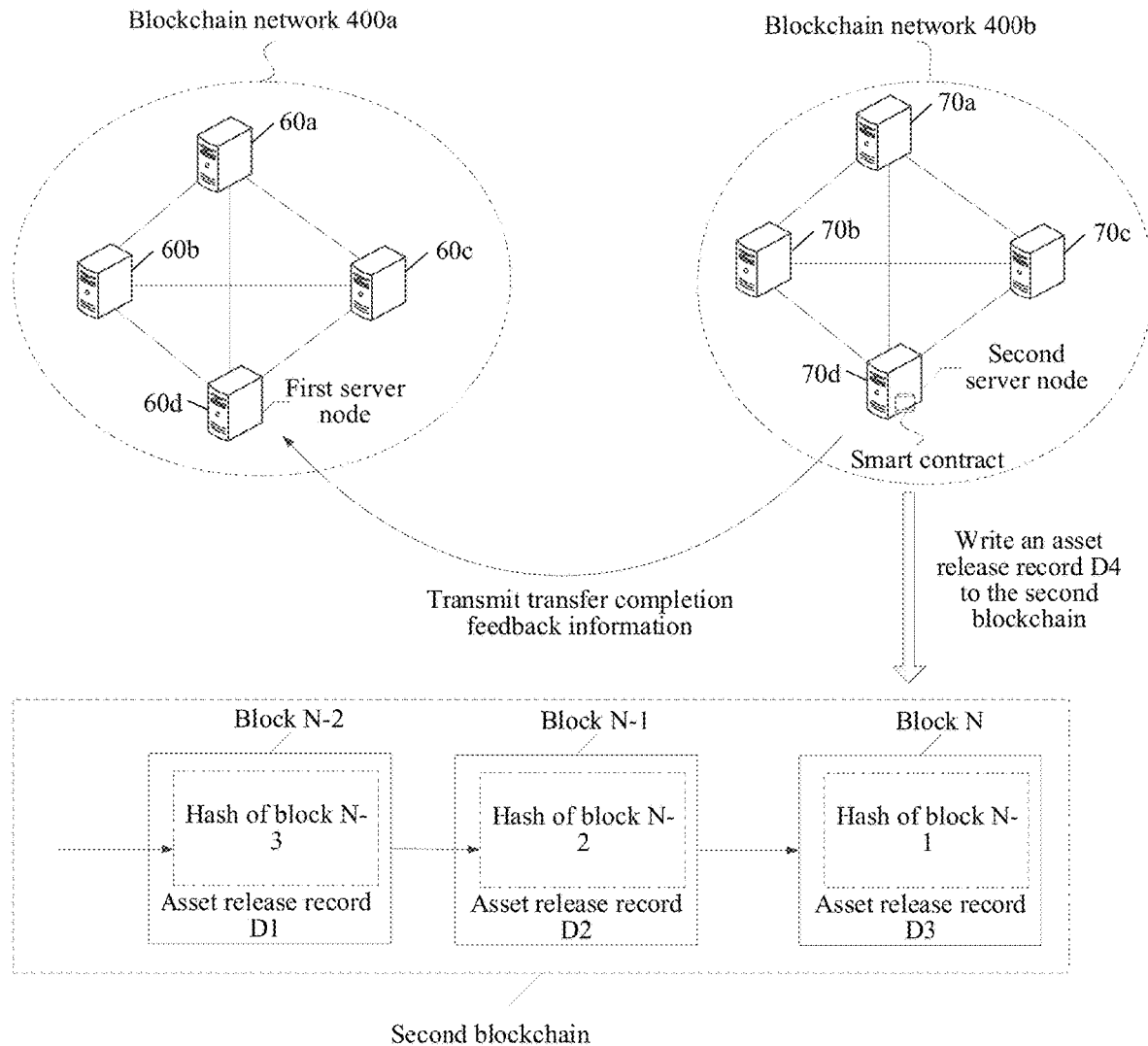
FIG. 6 is a schematic diagram of a scenario of generating transfer feedback information according to embodiment(s) of the present disclosure.

For ease of understanding, further, FIG. 6 is a schematic diagram of a scenario of generating transfer feedback information according to an embodiment of the present disclosure. A blockchain network 400a shown in FIG. 6 may be the blockchain network corresponding to the first blockchain. The blockchain network 400a may include a node device 60a, a node device 60b, a node device 60c, and a node device 60d shown in FIG. 6. The node device 60d shown in FIG. 6 may be the first server node associated with the user M. Similarly, a blockchain network 400b shown in FIG. 6 may be the blockchain network corresponding to the second blockchain. The blockchain network 400b may include a node device 70a, a node device 70b, a node device 70c, and a node device 70d shown in FIG. 6. The node device 70d shown in FIG. 6 may be the second server node for receiving the cross-chain asset transfer request. As shown in FIG. 6, after releasing the second asset (for example, the electronic bill A') associated with the first asset through the smart contract shown in FIG. 6, the second server node may transmit the new asset release record (for example, an asset release record D4 shown in FIG. 6) to $M_2$ consensus nodes (for example, the node device 70a, the node device 70b, and the node device 70c) in the blockchain network 400b shown in FIG. 6, and may add the asset release record D4 to the second blockchain shown in FIG. 6 after the consensus nodes reach a consensus on the asset release record.

In certain embodiment(s), before the second server node uploads the asset release record D4 to the chain, the $M_2$ consensus nodes in the same blockchain network may obtain the asset release record D4 transmitted by the second server node. The asset release record D4 may carry signature information after the second asset is signed by using a second private key of the second server node. Further, the $M_2$ consensus nodes may verify the signature information of the second server node based on the second public key of the second server node, and after the verification succeeds, allow the second server node to write the asset release record D4 into the second blockchain.

In certain embodiment(s), after the second server node shown in FIG. 6 releases the second asset, transfer feedback information shown in FIG. 6 may be generated, and the transfer feedback information may be returned to the first server node shown in FIG. 6, to notify the first server node that the cross-chain asset transfer is performed. In addition, In certain embodiment(s), after the second server node writes the asset release record (referred to as the release record for short) associated with the second asset into the second blockchain, it is conducive for the tax bureau of the city B to subsequently conduct risk control and security audits on the electronic bill A' (that is, the second asset) through the asset release record D4 stored on the second blockchain.

In certain embodiment(s), the asset type of the second asset in this embodiment of the present disclosure may be the same as that of the first asset. In this embodiment of the present disclosure, the asset type of the second asset may alternatively be different from the asset type of the first asset, and this is not limited herein. In certain embodiment(s), the second server node may subsequently transfer the second asset to the account address (that is, the blockchain address 3) of the enterprise 2 (that is, the second user), so that the enterprise 2 may subsequently be used as a reimbursement company to transfer the electronic bill A' on the second blockchain, which is not limited herein.

In certain embodiment(s), the first asset herein may alternatively be the electronic money (for example, the asset P in the embodiment corresponding to FIG. 2). For the specific process in which the first server node on the first blockchain transfers the asset P (that is, the first asset) across the chain to the second server node on the second blockchain, reference may be made to the description of the cross-chain transfer of the electronic bill A in the embodiment corresponding to FIG. 3, and details are not described herein again.

In this embodiment of the present disclosure, data exchange may be directly performed between the first blockchain and the second blockchain by calling the asset transfer interface on the second blockchain. For example, the cross-chain asset transfer request generated on the first blockchain may be quickly transmitted to the second blockchain, improving the efficiency of cross-chain asset transfer. In addition, in the entire process of cross-chain asset transfer, the asset transfer interface between the first blockchain and the second blockchain may be used as a bridge for asset transfer, to directly notify, through the asset transfer interface, the second server node to release the new asset (that is, the second asset) on the second blockchain while freezing the first asset on the first blockchain. The entire cross-chain asset transfer process may not require a third-party intermediary, which can effectively improve the security of cross-chain asset transfer.

Figure 7:
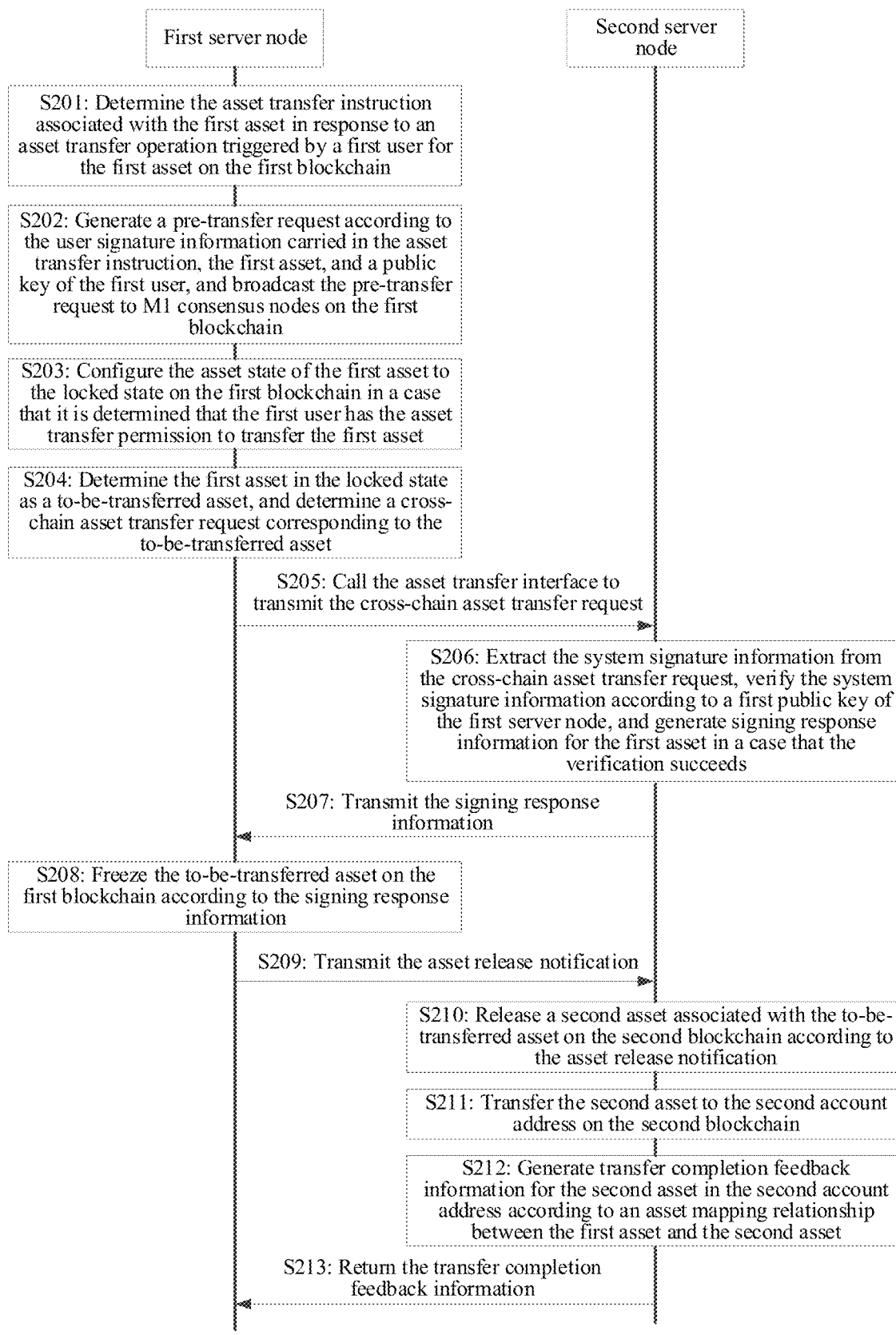
FIG. 7 is an interaction sequence diagram of a cross-blockchain data processing method according to embodiment(s) of the present disclosure.

Further, FIG. 7 is an interaction sequence diagram of a cross-blockchain data processing method according to an embodiment of the present disclosure. The method may be performed interactively by the first server node on the first blockchain and the second blockchain node on the second blockchain. The first server node may be any node device in the blockchain network 100a shown in FIG. 1 (for example, the node device 10a). The second server node may be any node device in the blockchain network 100b shown in FIG. 1 (for example, the node device 20a). The method includes the following steps of S201 to S213:

Step S201: The first server node may determine the asset transfer instruction associated with the first asset in response to an asset transfer operation triggered by a first user for the first asset on the first blockchain.

The asset transfer instruction carries user signature information associated with the first user. The user signature information is obtained after the first asset is signed by using a private key of the first user.

Step S202: The first server node may generate a pre-transfer request according to the user signature information carried in the asset transfer instruction, the first asset, and a public key of the first user, and broadcast the pre-transfer request to M1 consensus nodes on the first blockchain, so that the M1 consensus nodes verify asset transfer permission of the first user based on the pre-transfer request.

M1 is a positive integer greater than 2.

Step S203: The first server node configures the asset state of the first asset to the locked state on the first blockchain when or in response to determining that it is determined that the first user has the asset transfer permission to transfer the first asset.

In certain embodiment(s), the first asset herein may include, but is not limited to: virtual assets such as digital assets, electronic bills, and electronic money. For ease of understanding, the first asset being electronic money is taken as an example for illustration in this embodiment of the present disclosure. The electronic money may be the asset P in the embodiment corresponding to FIG. 2. Therefore, when a user X may transfer the asset P on the first blockchain to a user Y on the second blockchain, the cross-chain interaction is desirable. To prevent the asset P from continuing to circulate on the first blockchain, in this embodiment of the present disclosure, when it is detected that the user X has permission to transfer the asset P, the asset state of the first asset (that is, the asset P) is configured to the locked state on the first blockchain. For example, when it is determined during signature verification that the user X who transfers the asset P is himself/herself, and a quantity of asset balances under an account address of the user X on the first blockchain is greater than the asset quantity of the asset P, it may be determined that the user X has the asset transfer permission.

Step S204: The first server node may determine the first asset in the locked state as a to-be-transferred asset, and determine a cross-chain asset transfer request corresponding to the to-be-transferred asset.

In certain embodiment(s), the term "to-be-transferred asset" is interchangeable with the term "an asset" or "the asset."

The cross-chain asset transfer request may carry system signature information associated with a first private key of the first server node.

Step S205: The first server node obtains an asset transfer interface associated with a second blockchain, and calls the asset transfer interface to transmit the cross-chain asset transfer request to a second server node on the second blockchain.

Step S206: The second server node may extract the system signature information from the cross-chain asset transfer request, verify the system signature information according to a first public key of the first server node, and generate signing response information for the first asset when or in response to determining that the verification succeeds.

In certain embodiment(s), the second server node may extract the system signature information from the cross-chain asset transfer request, and broadcast the first public key of the first server node to M2 consensus nodes on the second blockchain, so that the M2 consensus nodes verify the system signature information, M2 being a positive integer greater than 2. Further, the second server node may receive verification results returned by the M2 consensus nodes, one consensus node being corresponding to one verification result. Further, the second server node may determine that the verification succeeds when or in response to determining that more than M2/2 verification results are successful verification results among the M2 verification results, and obtain a historical asset transfer list associated with the second server node when or in response to determining that the verification succeeds, the historical asset transfer list including at least one historical asset transfer request. Further, the second server node may determine, when or in response to determining that there is no historical asset transfer request matching the cross-chain asset transfer request in the historical asset transfer list, that the cross-chain asset transfer request is the first asset transfer request for the to-be-transferred asset, and generate the signing response information for the first asset.

Figure 8:
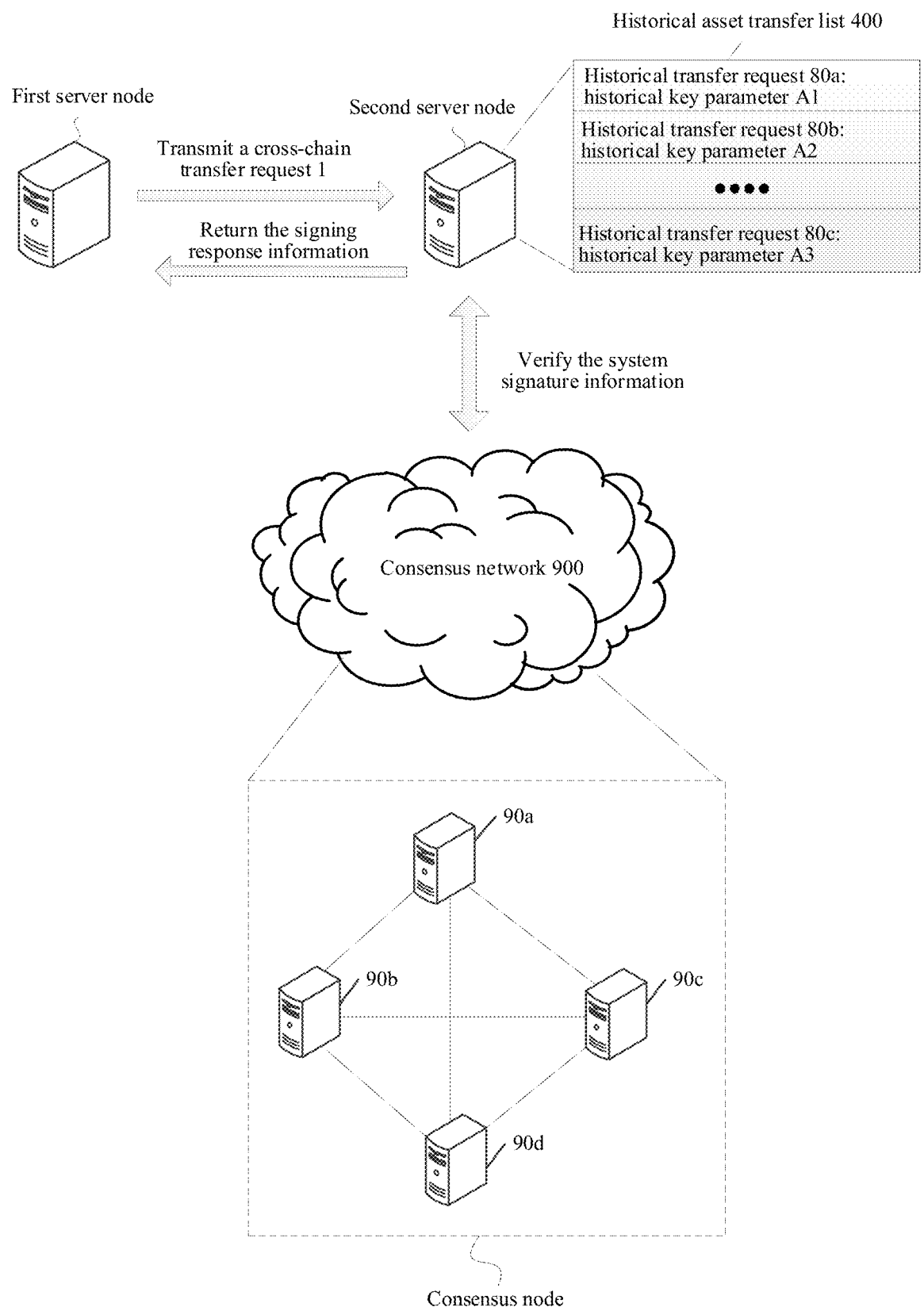
FIG. 8 is a schematic diagram of a scenario of generating signing response information according to embodiment(s) of the present disclosure.

For ease of understanding, further, FIG. 8 is a schematic diagram of a scenario of generating signing response information according to an embodiment of the present disclosure. A first server node shown in FIG. 8 may be the first node 30*b* in the embodiment corresponding to FIG. 2, that is, the first server node may obtain the asset transfer instruction transmitted by the user X for the asset P. As shown in FIG. 8, after the first server node configures the asset state of the asset P to the locked state according to the asset transfer instruction, the asset P in the locked state (that is, the first asset in the locked state) may be referred to as a to-be-transferred asset, so that a cross-chain transfer request 1 shown in FIG. 8 may be transmitted to a second server node shown in FIG. 8. The cross-chain transfer request 1 may be the cross-chain asset transfer request.

In this embodiment of the present disclosure, key parameters carried in the cross-chain transfer request 1 may be collectively referred to as target key parameters, where the target key parameters may include at least the following key parameters: the system signature information, the user signature information associated with the user X (that is, the first user), the blockchain address of the user X on the first blockchain (that is, the first account address of the first user), the blockchain address (that is, the second account address of the second user) of the user Y (that is, the second user) on the second blockchain, a transfer request timestamp associated with the asset P (that is, the first asset), or the like. The specific content of the target key parameters is not listed herein. The transfer request timestamp may be a timestamp (for example, a timestamp Ti) when the user X performs a trigger operation on the display interface where the first asset is located. In certain embodiment(s), when the asset transfer interface corresponding to the second server node (for example, a transfer interface E) obtains the cross-chain transfer request 1, the cross-chain transfer request 1 may be recorded locally on the second server node, and the system signature information carried in the cross-chain transfer request 1 is extracted, to verify the system signature information through the first public key of the first server node.

The specific process for the second server node to verify the system signature information may be as follows. The second server node shown in FIG. 8 may broadcast the system signature information and the first public key of the first server node to a consensus network 900 shown in FIG. 8. The consensus network 900 may include M2 (for example, M2=4) consensus nodes shown in FIG. 8. In other words, a node device 90*a*, a node device 90*b*, a node device 90*c*, and a node device 90*d* shown in FIG. 8 are all consensus nodes on the second blockchain. In certain embodiment(s), after obtaining the system signature information, the consensus nodes may verify the system signature information based on the first public key of the first server node, to obtain four verification nodes.

In certain embodiment(s), the second server node shown in FIG. 8 may receive a verification result returned by the four consensus nodes, and may determine that the verification succeeds when or in response to determining that more than half of the verification results are successful verification results among the verification nodes. In certain embodiment(s), the successful verification herein means that the second server node may confirm that the cross-chain transfer request 1 comes from the first server node in the first blockchain. In this implementation, the second server node may obtain a historical asset transfer list 400 shown in FIG. 8 in a local interaction record library.

As shown in FIG. 8, the historical asset transfer list 400 may include all historical transfer requests obtained by the second server node during a lock duration of the asset P. For example, the historical asset transfer list 400 may include a historical transfer request 80*a*, a historical transfer request 80*b*, . . . , and a historical transfer request 80*c* shown in FIG. 8. To facilitate the distinction from the key parameters in the currently received cross-chain transfer request 1, in this embodiment of the present disclosure, the key parameters carried in the historical transfer requests are collectively referred to as historical key parameters. A historical key parameter carried in the historical transfer request 80*a* may be a historical key parameter A1 shown in FIG. 8, a historical key parameter carried in the historical transfer request 80*b* may be a historical key parameter A2 shown in FIG. 8, . . . , and a historical key parameter carried in the historical transfer request 80*c* may be a historical key parameter A3 shown in FIG. 8.

To determine whether the first asset in the currently obtained cross-chain transfer request is an asset transferred for the first time (that is, whether there is a double spending phenomenon), in this embodiment of the present disclosure, historical key parameters that are the same as the target key parameters may be searched in the historical asset transfer list 400 shown in FIG. 8. If historical key parameter that are the same as the target key parameters are found, it indirectly indicates that the first server node on the first blockchain has been maliciously attacked, so that there is a phenomenon of repeatedly transmitting requests in a short period of time (that is, within the locked duration of the first asset). In this implementation, the first server node may reject the cross-chain transfer request 1 for the asset P transmitted by the first server node, to avoid asset loss caused to the first blockchain or the second blockchain, thereby ensuring the security of cross-chain asset transfer.

In this embodiment of the present disclosure, if historical key parameters that are the same as the target key parameters cannot be found in the historical asset transfer list 400 shown in FIG. 8, it may be determined that there is no phenomenon of repeatedly transmitting requests within the locked duration of the first asset. That is, the second server node may determine that the currently obtained cross-chain asset transfer request is the first asset transfer request for the asset P, and may then generate signing response information for the first asset. As shown in FIG. 8, after confirming to sign for the asset P, the second server node may perform the following step S207, to return the signing response information to the first server node shown in FIG. 8.

In certain embodiment(s), the records of the data exchange between the first server node and the second server node through the asset transfer interface may be recorded locally on the first server node and the second server node respectively, and details are not described herein again.

As can be seen, in this embodiment of the present disclosure, before the signing response information for the to-be-transferred asset (that is, the asset P in the locked state) is generated, the target key parameters in the obtained cross-chain asset transfer request are checked on the second blockchain to prevent malicious attacks. In certain embodiment(s), the second server node may use user signature information in the cross-chain asset transfer request, a first account address of the first user, a second account address of a second user on the second blockchain, and a transfer request timestamp associated with the first asset as target key parameters in the cross-chain asset transfer request. The user signature information is obtained after the first asset is signed by using a private key of the first user. Further, the second server node may search the historical asset transfer list for historical key parameters the same as the target key parameters, the historical key parameters being key parameters in the corresponding historical asset transfer request in the historical asset transfer list. Further, the second server node may determine, when or in response to determining that the historical key parameters the same as the target key parameters are not found, that there is no historical asset transfer request matching the cross-chain asset transfer request in the at least one historical asset transfer request.

Step S207: Transmit the signing response information to the first server node.

Step S208: The first server node freezes the to-be-transferred asset on the first blockchain according to the signing response information.

In certain embodiment(s), the first server node may receive the signing response information transmitted by the second server node when or in response to determining that the verification succeeds, and change the asset state of the to-be-transferred asset to a frozen state on the first blockchain according to the signing response information. Further, the first server node may obtain an asset recovery address associated with the first blockchain, and add the to-be-transferred asset in the frozen state to the asset recovery address.

Step S209: The first server node generates asset release notification used for notifying the second server node to release the second asset associated with the to-be-transferred asset on the second blockchain, and transmits the asset release notification to the second server node.

In other words, the second server node may receive the asset release notification transmitted by the first server node when the freezing is performed.

Step S210: The second server node releases a second asset associated with the to-be-transferred asset on the second blockchain according to the asset release notification.

In certain embodiment(s), the second server node may receive the asset release notification transmitted by the first server node when or in response to determining that the freezing is performed, and determine an asset type of the to-be-transferred asset in the locked state in the asset release notification as a first asset type. Further, the second server node may obtain a second asset type associated with the second blockchain, and identify the first asset type and the second asset type. In certain embodiment(s), the second server node may directly release the second asset associated with the to-be-transferred asset on the second blockchain when or in response to determining that it is identified that the first asset type is the same as the second asset type. In this embodiment of the present disclosure, the second server node may call, when or in response to determining that it is identified that the first asset type is different from the second asset type, a smart contract in the second server node to convert the to-be-transferred asset of the first asset type to the second asset of the second asset type.

For ease of understanding, in this embodiment of the present disclosure, an example is taken in which a first encrypted money on the first blockchain is bitcoin, and a second encrypted money on the second blockchain is ether, to illustrate the specific process of releasing the second asset on the second blockchain. For ease of understanding, in this embodiment of the present disclosure, an example is taken in which the to-be-transferred asset (that is, the asset P in the locked state) is five bitcoins (that is, the asset quantity of the first encrypted money is five) locked on the first blockchain. When the second server node on the second blockchain obtains the cross-chain asset transfer request (for example, the cross-chain transfer request 1 shown in FIG. 8), it may be determined whether the five bitcoins locked on the first blockchain and carried in the cross-chain transfer request 1 are signed. If it is determined that the five bitcoins are signed, the second server node may call the smart contract running on the second server node to perform asset conversion (that is, the asset conversion may be performed according to the asset quantity of the first encrypted money), to determine the quantity of the second encrypted money expected to be released on the second blockchain, for example, the quantity of the second encrypted money may be 10 ethers.

In this implementation, the second server node may call the asset release interface at the bottom of the second server, and release 10 ethers on the second server node. The released 10 ethers are referred to as the second asset. In certain embodiment(s), after successfully releasing the second asset, the second server node may generate an asset release record associated with the second asset, and may write the asset release record to the second blockchain. In certain embodiment(s), the asset release record may include: the quantity of the second encrypted money (that is, the asset quantity of the second asset), a release timestamp, the asset mapping relationship between the first asset and the second asset, the second public key of the second server node, the M2 nodes participating in the consensus, and the like. In addition, the second server node may further perform the following steps S211 to S213. That is, based on the asset mapping relationship between the first asset and the second asset, the transfer feedback information is generated to return the transfer feedback information to the first server node.

Step S211: The second server node may transfer the second asset to the second account address on the second blockchain.

Step S212: The second server node may generate transfer feedback information for the second asset in the second account address according to an asset mapping relationship between the first asset and the second asset.

Step S213: The second server node may return the transfer feedback information to the first server node.

In certain embodiment(s), when confirming that the cross-chain asset transfer is performed, the second server node may generate the transfer feedback information for the second asset, and then may return the transfer feedback information to the first server node, to notify the first server node that the asset transfer is successfully performed at present. That is, the first asset under the first user account address on the first blockchain has been successfully transferred to the second account address of the second user on the second blockchain through the asset transfer interface.

In certain embodiment(s), the first asset may further include the electronic bill (for example, the electronic bill A), and details are not described herein again. In certain embodiment(s), after the second server node performs the cross-chain asset transfer, the first server node may destroy the first asset (for example, the electronic bill A and the asset P) in the recovery address, to prevent the first asset from continuing to circulate on the first blockchain.

In this embodiment of the present disclosure, data exchange may be directly performed between the first blockchain and the second blockchain by calling the asset transfer interface on the second blockchain. For example, the cross-chain asset transfer request generated on the first blockchain may be quickly transmitted to the second blockchain, improving the efficiency of cross-chain asset transfer. In addition, in the entire process of cross-chain asset transfer, the asset transfer interface between the first blockchain and the second blockchain may be used as a bridge for asset transfer, to directly notify, through the asset transfer interface, the second server node to release the new asset (that is, the second asset) on the second blockchain while freezing the first asset on the first blockchain. The entire cross-chain asset transfer process may not require a third-party intermediary, which can effectively improve the security of cross-chain asset transfer.

Figure 9:
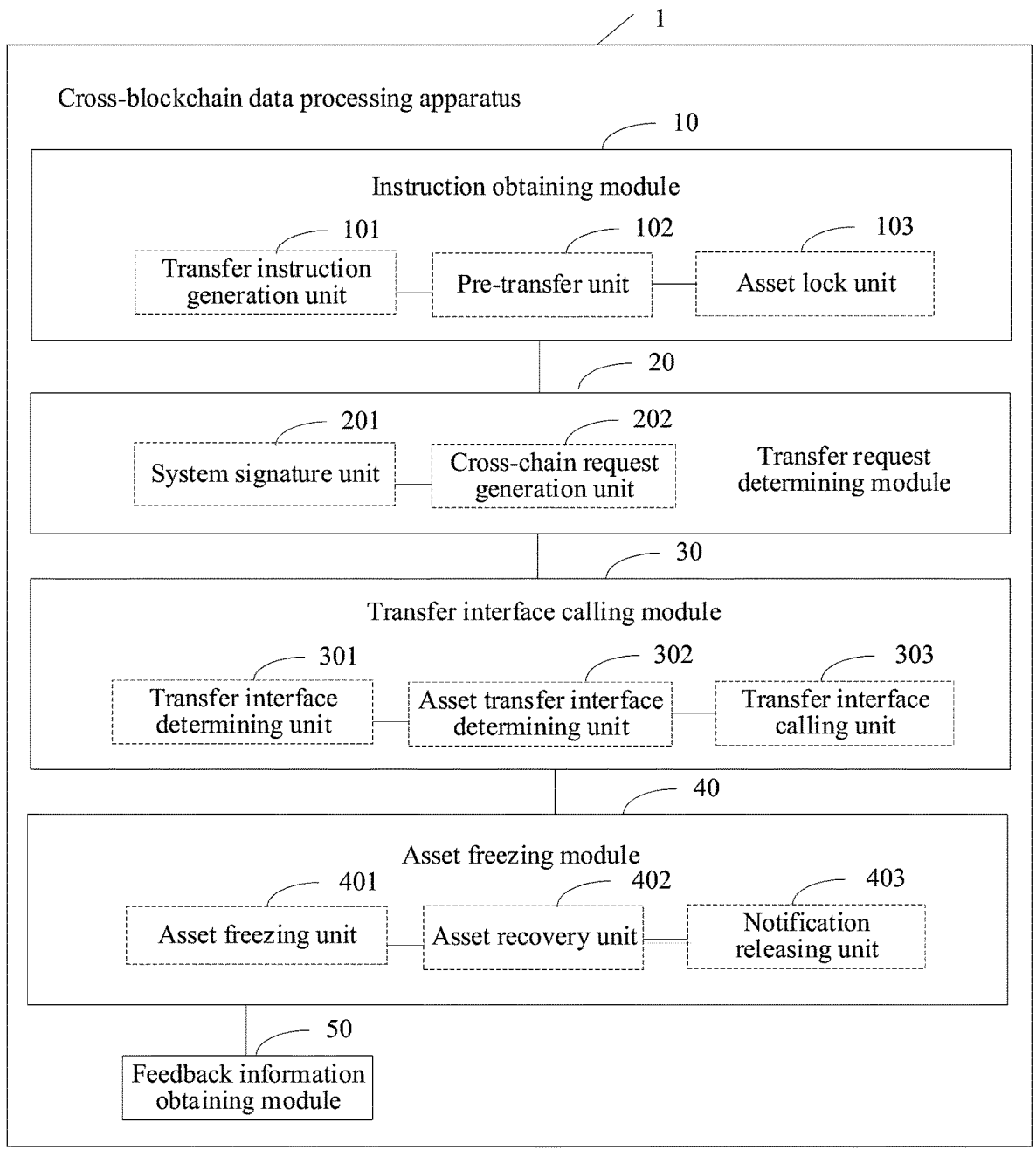
FIG. 9 is a schematic structural diagram of a cross-blockchain data processing apparatus according to embodiment(s) of the present disclosure.

Further, FIG. 9 is a schematic structural diagram of a cross-blockchain data processing apparatus 1 according to an embodiment of the present disclosure. The cross-blockchain data processing apparatus 1 may run on a first server node on a first blockchain. The first server node may be any node device (for example, the node device 10a) in the blockchain network 100a shown in FIG. 1. The cross-blockchain data processing apparatus 1 may be a computer program (including program code) running on the node device 10a, for example, the cross-blockchain data processing apparatus 1 may be implementation software in the node device 10a. The cross-blockchain data processing apparatus 1 may be used to perform the corresponding steps in the method provided in the embodiments of the present disclosure. As shown in FIG. 9, the cross-blockchain data processing apparatus 1 may include: an instruction obtaining module 10, a transfer request determining module 20, a transfer interface calling module 30, and an asset freezing module 40. Further, the cross-blockchain data processing apparatus 1 may further include a feedback information obtaining module 50.

The instruction obtaining module 10 is configured to obtain an asset transfer instruction triggered by a first user for a first asset on the first blockchain, and configure an asset state of the first asset to a locked state on the first blockchain.

The instruction obtaining module 10 includes: a transfer instruction generation unit 101, a pre-transfer unit 102, and an asset lock unit 103.

The transfer instruction generation unit 101 is configured to determine the asset transfer instruction associated with the first asset in response to an asset transfer operation triggered by a first user for the first asset on the first blockchain, the asset transfer instruction carrying user signature information associated with the first user, the user signature information being obtained after the first asset is signed by using a private key of the first user.

The pre-transfer unit 102 is configured to generate a pre-transfer request according to the user signature information carried in the asset transfer instruction, the first asset, and a public key of the first user, and broadcasting the pre-transfer request to M1 consensus nodes on the first blockchain, so that the M1 consensus nodes verify asset transfer permission of the first user based on the pre-transfer request, M1 being a positive integer greater than 2;

The asset lock unit 103 is configured to configure the asset state of the first asset to the locked state on the first blockchain when or in response to determining that it is determined that the first user has the asset transfer permission to transfer the first asset.

For the specific implementations of the transfer instruction generation unit 101, the pre-transfer unit 102, and the asset lock unit 103, reference may be made to the description of step S101 in the embodiment corresponding to FIG. 3, and details are not described herein again.

The transfer request determining module 20 is configured to determine the first asset in the locked state as a to-be-transferred asset, and determine a cross-chain asset transfer request corresponding to the to-be-transferred asset, the cross-chain asset transfer request carrying system signature information associated with a first private key of the first server node;

The transfer request determining module 20 includes: a system signature unit 201 and a cross-chain request generation unit 202.

The system signature unit 201 is configured to determine the first asset in the locked state as the to-be-transferred asset, and sign the user signature information and the to-be-transferred asset by using the first private key of the first server node, to obtain the system signature information associated with the to-be-transferred asset.

The cross-chain request generation unit 202 is configured to generate the cross-chain asset transfer request corresponding to the to-be-transferred asset according to the system signature information, the user signature information, the to-be-transferred asset, and the first public key of the first server node.

For the specific implementations of the system signature unit 201 and the cross-chain request generation unit 202, reference may be made to the description of step S102 in the embodiment corresponding to FIG. 3, and details are not described herein again.

The transfer interface calling module 30 is configured to obtain an asset transfer interface associated with a second blockchain, and call the asset transfer interface to transmit the cross-chain asset transfer request to a second server node on the second blockchain, so that the second server node verifies the system signature information according to a first public key of the first server node.

The transfer interface calling module 30 includes: a transfer interface determining unit 301, an asset transfer interface determining unit 302, and a transfer interface calling unit 303.

The transfer interface determining unit 301 is configured to determine at least one transfer interface associated with a unified access interface on the second blockchain according to a communication mapping relationship between the first blockchain and the second blockchain, one transfer interface being corresponding to one server node on the second blockchain;

The asset transfer interface determining unit 302 is configured to determine the asset transfer interface for receiving the cross-chain asset transfer request in the at least one transfer interface, and determine a server node corresponding to the asset transfer interface as the second server node on the second blockchain.

The transfer interface calling unit 303 is configured to call the asset transfer interface to transmit the cross-chain asset transfer request to the second server node on the second blockchain.

For the specific implementations of the transfer interface determining unit 301, the asset transfer interface determining unit 302, and the transfer interface calling unit 303, reference may be made to the description of step S103 in the embodiment corresponding to FIG. 3, and details are not described herein again.

The asset freezing module 40 is configured to receive signing response information transmitted by the second server node when or in response to determining that the verification succeeds, freeze the to-be-transferred asset on the first blockchain according to the signing response information, and notify the second server node to release a second asset associated with the to-be-transferred asset on the second blockchain.

The asset freezing module 40 includes: an asset freezing unit 401, an asset recovery unit 402, and a notification releasing unit 403.

The asset freezing unit 401 is configured to receive the signing response information transmitted by the second server node when or in response to determining that the verification succeeds, and change the asset state of the to-be-transferred asset to a frozen state on the first blockchain according to the signing response information.

The asset recovery unit 402 is configured to obtain an asset recovery address associated with the first blockchain, and add the to-be-transferred asset in the frozen state to the asset recovery address.

The notification releasing unit 403 is configured to notify the second server node to release the second asset associated with the to-be-transferred asset on the second blockchain.

For the specific implementations of the asset freezing unit 401, the asset recovery unit 402, and the notification releasing unit 403, reference may be made to the description of step S104 in the embodiment corresponding to FIG. 3, and details are not described herein again.

In this embodiment of the present disclosure, the feedback information obtaining module 50 is configured to obtain transfer feedback information transmitted by the second server node for the second asset, the transfer feedback information comprising an asset mapping relationship between the first asset and the second asset, the asset mapping relationship being used for describing a conversion relationship between a first asset type of the first asset and a second asset type of the second asset during asset conversion.

For the specific implementations of the instruction obtaining module 10, the transfer request determining module 20, the transfer interface calling module 30, the asset freezing module 40, and the feedback information obtaining module 50, reference may be made to the description of the first server node on the first blockchain in the embodiment corresponding to FIG. 3, and details are not described herein again. In addition, the description of beneficial effects of the same method is not described herein again.

Figure 10:
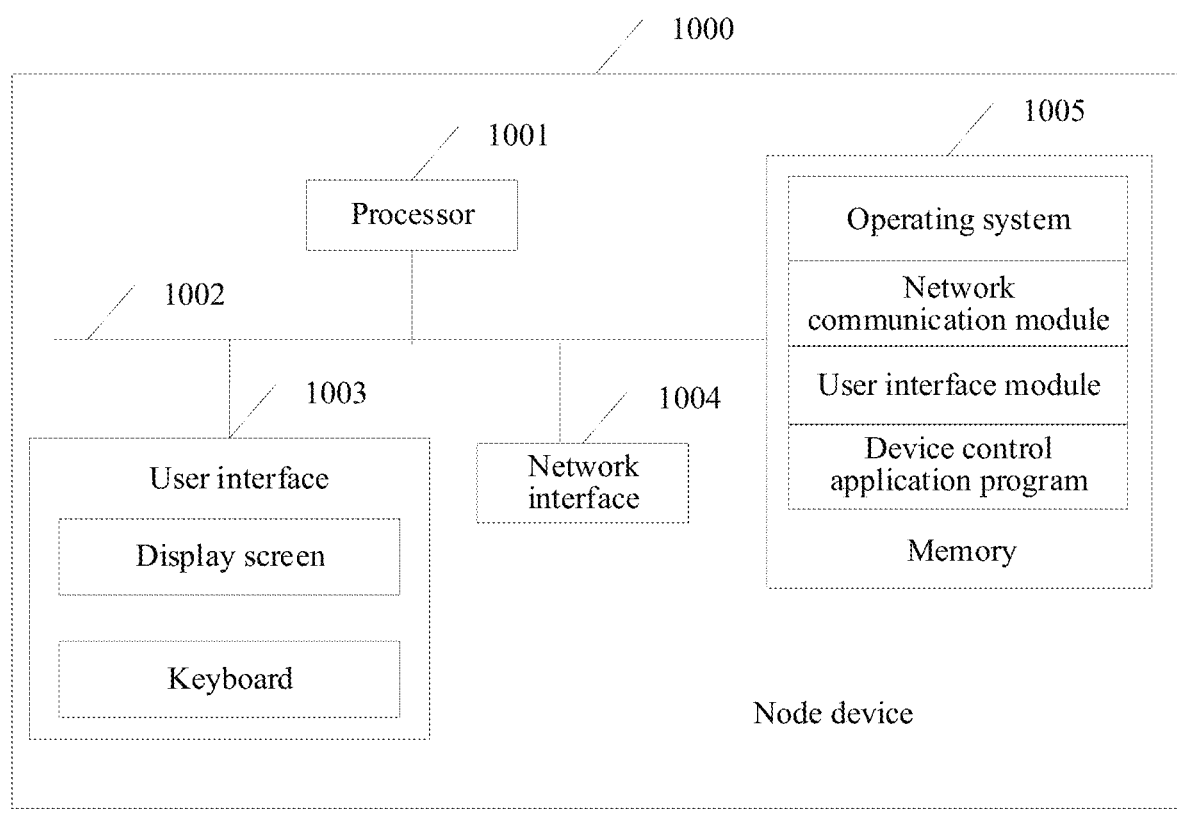
FIG. 10 is a schematic structural diagram of a node device according to embodiment(s) of the present disclosure.

Further, FIG. 10 is a schematic structural diagram of a node device according to an embodiment of the present disclosure. As shown in FIG. 10, the node device 1000 may be the first node 30*b* in the embodiment corresponding to FIG. 2. The node device 1000 may include: at least one processor 1001, such as a CPU, at least one network interface 1004, a user interface 1003, a memory 1005, and at least one communication bus 1002. The communication bus 1002 is configured to implement connection and communication between the components. The user interface 1003 may include a display and a keyboard. The network interface 1004 may include a standard wired interface and a standard wireless interface (for example, a WI-FI interface). The memory 1005 may be a high-speed RAM, or may be a non-volatile memory, for example, at least one magnetic disk memory. In certain embodiment(s), the memory 1005 may be at least one storage apparatus located remotely from the processor 1001. As shown in FIG. 10, the memory 1005, which is used as a computer storage medium, may include an operating system, a network communication module, a user interface module, and a device control application program.

In the node device 1000 shown in FIG. 10, the network interface 1004 is configured to provide a network communication function; the user interface 1003 is configured to provide an input interface for the user, and the processor 1001 may be configured to call the device control application program stored in the memory 1005, to implement the following operations: obtaining an asset transfer instruction triggered for a first asset on the first blockchain, and configuring an asset state of the first asset to a locked state on the first blockchain; determining the first asset in the locked state as a to-be-transferred asset, and determining a cross-chain asset transfer request corresponding to the to-be-transferred asset, the cross-chain asset transfer request carrying system signature information associated with a first private key of the first server node; obtaining an asset transfer interface associated with a second blockchain, and calling the asset transfer interface to transmit the cross-chain asset transfer request to a second server node on the second blockchain, so that the second server node verifies the system signature information according to a first public key of the first server node; and receiving signing response information transmitted by the second server node when or in response to determining that the verification succeeds, freezing the to-be-transferred asset on the first blockchain according to the signing response information, and notifying the second server node to release a second asset associated with the to-be-transferred asset on the second blockchain.

In certain embodiment(s), the node device 1000 described in this embodiment of the present disclosure can implement the descriptions of the cross-blockchain data processing method in the embodiments corresponding to FIG. 3 and FIG. 7, and can also implement the descriptions of the cross-blockchain data processing apparatus 1 in the embodiment corresponding to FIG. 9. Details are not described herein again. In addition, the description of beneficial effects of the same method is not described herein again.

In addition, an embodiment of the present disclosure further provides a computer-readable storage medium. The computer-readable storage medium stores a computer program executed by the cross-blockchain data processing apparatus 1, and the computer program includes program instructions. When executing the program instructions, a processor can cause a computing device including the processor to perform the descriptions of the cross-blockchain data processing method in the embodiments corresponding to FIG. 3 and FIG. 7. Therefore, details are not described herein again. In addition, the description of beneficial effects of the same method is not described herein again. For technical details that are not disclosed in the embodiments of the computer-readable storage medium of the present disclosure, reference may be made to the method embodiments of the present disclosure. In an example, the program instructions may be deployed to be executed on a node device, or deployed to be executed on a plurality of node devices at the same location, or deployed to be executed on a plurality of node devices that are distributed in a plurality of locations and interconnected by using a communication network. The plurality of node devices that are distributed in the plurality of locations and interconnected by using the communication network may form a blockchain system.

Figure 11:
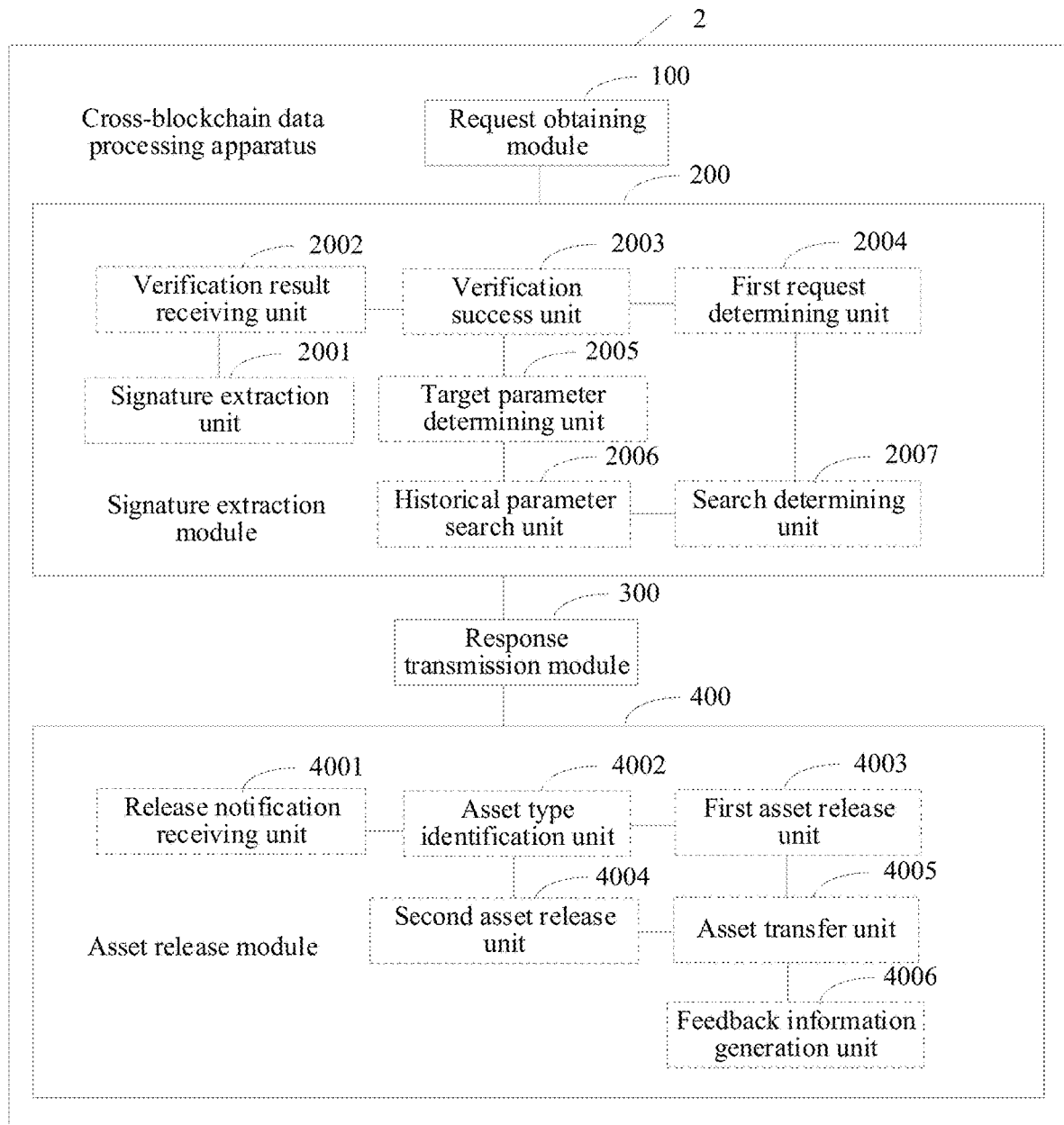
FIG. 11 is a schematic structural diagram of a cross-blockchain data processing apparatus according to embodiment(s) of the present disclosure.

Further, FIG. 11 is a schematic structural diagram of a cross-blockchain data processing apparatus 2 according to an embodiment of the present disclosure. The cross-blockchain data processing apparatus 2 may run on a second server node on a second blockchain. The second server node may be any node device (for example, the node device 20*a*) in the blockchain network 100*b* shown in FIG. 1. The cross-blockchain data processing apparatus 2 may be a computer program (including program code) in the node device 20*a*, for example, the cross-blockchain data processing apparatus 2 may be implementation software in the node device 20*a*. The cross-blockchain data processing apparatus 2 may be used to perform the corresponding steps in the method provided in the embodiments of the present disclosure. As shown in FIG. 11, the cross-blockchain data processing apparatus 2 includes: a request obtaining module 100, a signature extraction module 200, a response transmission module 300, and an asset release module 400.

The request obtaining module 100 is configured to obtain a cross-chain transfer request transmitted by a first server node on a first blockchain through an asset transfer interface, the cross-chain asset transfer request carrying system signature information associated with a first private key of the first server node and a to-be-transferred asset, the system signature information being determined by the first server node according to an obtained asset transfer instruction of a first asset, the to-be-transferred asset being the first asset in a locked state, and the asset transfer instruction being used for instructing the first server node to configure an asset state of the first asset to the locked state on the first blockchain.

The signature extraction module 200 is configured to extract the system signature information from the cross-chain asset transfer request, verify the system signature information according to a first public key of the first server node, and generate signing response information for the first asset when or in response to determining that the verification succeeds.

The signature extraction module 200 includes: a signature extraction unit 2001, a verification result receiving unit 2002, a verification success unit 2003, and a first request determining unit 2004. Further, the signature extraction module 200 further includes: a target parameter determining unit 2005, a historical parameter search unit 2006, and a search determining unit 2007.

The signature extraction unit 2001 is configured to extract the system signature information from the cross-chain asset transfer request, and broadcast the first public key of the first server node to M2 consensus nodes on the second blockchain, so that the M2 consensus nodes verify the system signature information, M2 being a positive integer greater than 2;

The verification result receiving unit 2002 is configured to receive verification results returned by the M2 consensus nodes, one consensus node being corresponding to one verification result.

The verification success unit 2003 is configured to determine that the verification succeeds when or in response to determining that more than M2/2 verification results are successful verification results among the M2 verification results, and obtain a historical asset transfer list associated with the second server node when or in response to determining that the verification succeeds, the historical asset transfer list including at least one historical asset transfer request.

The first request determining unit 2004 is configured to determine, when or in response to determining that there is no historical asset transfer request matching the cross-chain asset transfer request in the historical asset transfer list, that the cross-chain asset transfer request is the first asset transfer request for the to-be-transferred asset, and generate the signing response information for the first asset.

In this embodiment of the present disclosure, the target parameter determining unit 2005 is configured to use user signature information in the cross-chain asset transfer request, a first account address of the first user, a second account address of a second user on the second blockchain, and a transfer request timestamp associated with the first asset as target key parameters in the cross-chain asset transfer request, the user signature information being obtained after the first asset is signed by using a private key of the first user.

The historical parameter search unit 2006 is configured to search the historical asset transfer list for historical key parameters the same as the target key parameters, the historical key parameters being key parameters in the corresponding historical asset transfer request in the historical asset transfer list.

The search determining unit 2007 is configured to determine, when or in response to determining that the historical key parameters the same as the target key parameters in the cross-chain asset transfer request are not found in the historical asset transfer list, that there is no historical asset transfer request matching the cross-chain asset transfer request in the historical asset transfer list.

For the specific implementations of the signature extraction unit 2001, the verification result receiving unit 2002, the verification success unit 2003, the first request determining unit 2004, the target parameter determining unit 2005, the historical parameter search unit 2006, and the search determining unit 2007, reference may be made to the description of the specific process of generating the signing response information in the embodiment corresponding to FIG. 8, and details are not described herein.

The response transmission module 300 is configured to transmit the signing response information to the first server node, so that the first server node freezes the to-be-transferred asset on the first blockchain according to the signing response information.

The asset release module 400 is configured to receive an asset release notification transmitted by the first server node when or in response to determining that the freezing is performed, and release a second asset associated with the to-be-transferred asset on the second blockchain according to the asset release notification.

The asset release module 400 includes: a release notification receiving unit 4001, an asset type identification unit 4002, a first asset release unit 4003, and a second asset release unit 4004. Further, the asset release module 400 further includes: an asset transfer unit 4005 and a feedback information generation unit 4006.

The release notification receiving unit 4001 is configured to receive the asset release notification transmitted by the first server node when or in response to determining that the freezing is performed, and determine an asset type of the to-be-transferred asset in the locked state in the asset release notification as a first asset type.

The asset type identification unit 4002 is configured to obtain a second asset type associated with the second blockchain, and identify the first asset type and the second asset type.

The first asset release unit 4003 is configured to release the second asset associated with the to-be-transferred asset on the second blockchain when or in response to determining that it is identified that the first asset type is the same as the second asset type.

The second asset release unit 4004 is configured to call, when or in response to determining that it is identified that the first asset type is different from the second asset type, a smart contract in the second server node to convert the to-be-transferred asset of the first asset type to the second asset of the second asset type.

In this embodiment of the present disclosure, the asset transfer unit 4005 is configured to transfer the second asset to the second account address on the second blockchain; and the feedback information generation unit 4006 is configured to generate transfer feedback information for the second asset in the second account address according to an asset mapping relationship between the first asset and the second asset, and return the transfer feedback information to the first server node.

For the specific implementations of the release notification receiving unit 4001, the asset type identification unit 4002, the first asset release unit 4003, the second asset release unit 4004, the asset transfer unit 4005, and the feedback information generation unit 4006, reference may be made to the description of the specific process of releasing the second asset in the embodiment corresponding to FIG. 7, and details are not described herein.

For the specific implementations of the request obtaining module 100, the signature extraction module 200, the response transmission module 300, and the asset release module 400, reference may be made to the description of step S201 to step S213 in the embodiment corresponding to FIG. 7, and details are not described herein. In addition, the description of beneficial effects of the same method is not described herein again.

Figure 12:
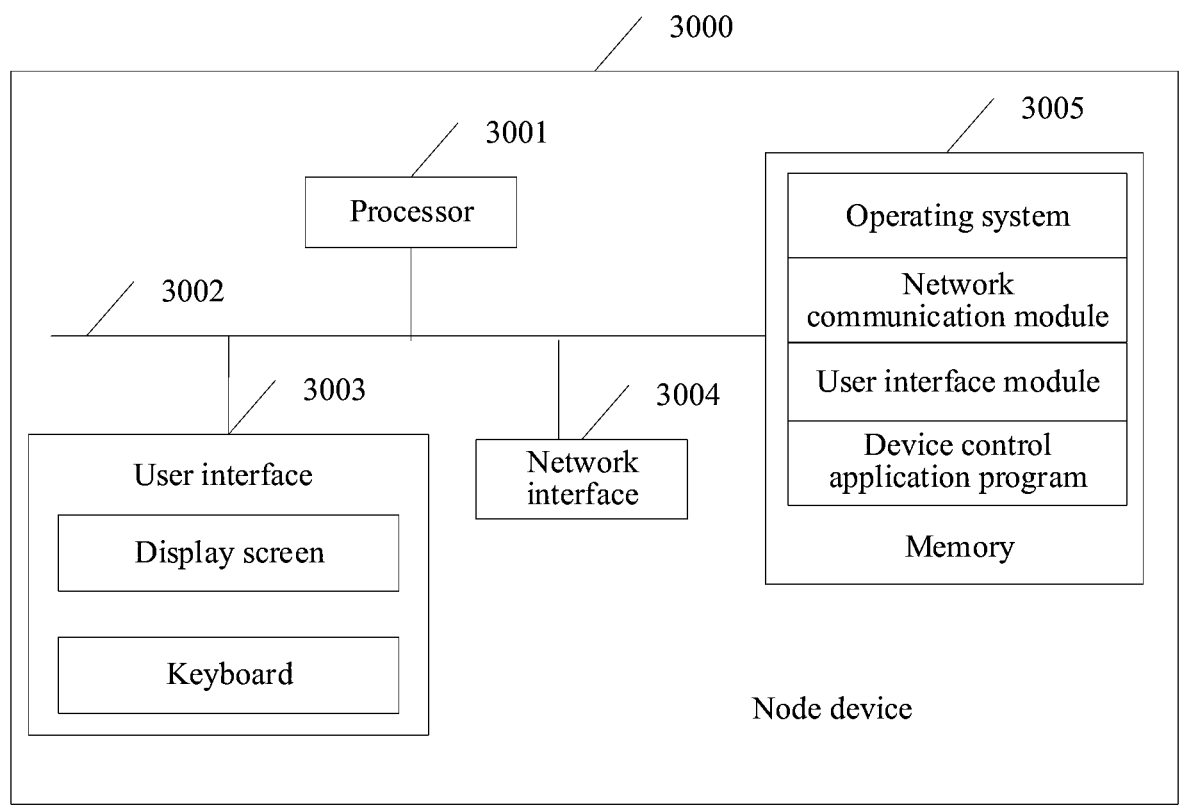
FIG. 12 is a schematic diagram of a node device according to embodiment(s) of the present disclosure.

Further, FIG. 12 is a schematic structural diagram of a node device according to an embodiment of the present disclosure. As shown in FIG. 12, the node device 3000 may be the second node 30c in the embodiment corresponding to FIG. 2. The node device 3000 may include: at least one processor 3001, such as a CPU, at least one network interface 3004, a user interface 3003, a memory 3005, and at least one communication bus 3002. The communication bus 3002 is configured to implement connection communication between the components. The user interface 3003 may include a display and a keyboard. The network interface 3004 may include a standard wired interface and a standard wireless interface (for example, a WI-FI interface). The memory 3005 may be a high-speed RAM, or may be a non-volatile memory, for example, at least one magnetic disk memory. In certain embodiment(s), the memory 3005 may be at least one storage apparatus located remotely from the processor 3001. As shown in FIG. 12, the memory 3005 used as a computer storage medium may include an operating system, a network communication module, a user interface module, and a device control application program.

In the node device 3000 shown in FIG. 12, the network interface 3004 is configured to provide a network communication function; the user interface 3003 is configured to provide an input interface for the user, and the processor 3001 may be configured to call the device control application program stored in the memory 3005, to implement the following operations: obtaining a cross-chain transfer request transmitted by a first server node on a first blockchain through an asset transfer interface, the cross-chain asset transfer request carrying system signature information associated with a first private key of the first server node and a to-be-transferred asset, the system signature information being determined by the first server node according to an obtained asset transfer instruction of a first asset, the to-be-transferred asset being the first asset in a locked state, and the asset transfer instruction being used for instructing the first server node to configure an asset state of the first asset to the locked state on the first blockchain; extracting the system signature information from the cross-chain asset transfer request, verifying the system signature information according to a first public key of the first server node, and generating signing response information for the first asset when or in response to determining that the verification succeeds; transmitting the signing response information to the first server node, so that the first server node freezes the to-be-transferred asset on the first blockchain according to the signing response information; and receiving an asset release notification transmitted by the first server node when or in response to determining that the freezing is performed, and releasing a second asset associated with the to-be-transferred asset on the second blockchain according to the asset release notification.

In certain embodiment(s), the node device 3000 described in this embodiment of the present disclosure can implement the descriptions of the cross-blockchain data processing method in the embodiments corresponding to FIG. 3 and FIG. 7, and can also implement the descriptions of the cross-blockchain data processing apparatus 2 in the embodiment corresponding to FIG. 11. Details are not described herein again. In addition, the description of beneficial effects of the same method is not described herein again.

In addition, an embodiment of the present disclosure further provides a computer-readable storage medium. The computer-readable storage medium stores a computer program executed by the cross-blockchain data processing apparatus 2, and the computer program includes program instructions. When executing the program instructions, a processor can cause a computing device including the processor to perform the descriptions of the cross-blockchain data processing method in the embodiments corresponding to FIG. 3 and FIG. 7. Therefore, details are not described herein again. In addition, the description of beneficial effects of the same method is not described herein again. For technical details that are not disclosed in the embodiments of the computer-readable storage medium of the present disclosure, refer to the method embodiments of the present disclosure. In an example, the program instructions may be deployed to be executed on a node device, or deployed to be executed on a plurality of node devices at the same location, or deployed to be executed on a plurality of node devices that are distributed in a plurality of locations and interconnected by using a communication network. The plurality of node devices that are distributed in the plurality of locations and interconnected by using the communication network may form a blockchain system.

Figure 13:
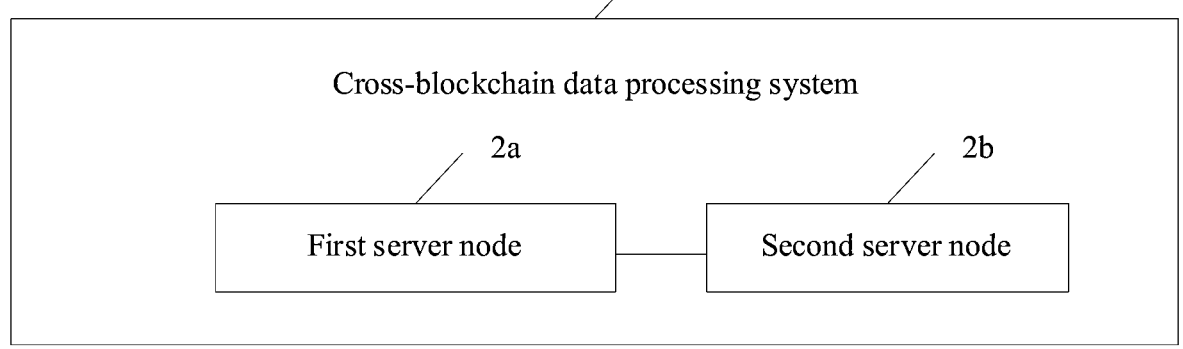
FIG. 13 is a schematic diagram of a cross-blockchain data processing system according to embodiment(s) of the present disclosure.

Further, FIG. 13 is a schematic diagram of a cross-blockchain data processing system according to an embodiment of the present disclosure. The cross-blockchain data processing system 3 may include a first server node 2a and a second server node 2b. The first server node 2a may be the first node 30b in the embodiment corresponding to FIG. 2, and the first node 30b may be any node device in the blockchain network 100a shown in FIG. 1. Details are not described herein again. The second server node 2b may be the second node 30c in the embodiment corresponding to FIG. 2, and the second node 30c may be any node device in the blockchain network 100b shown in FIG. 1. Details are not described herein again. In addition, the description of beneficial effects of the same method is not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A person skilled in the art may understand that all or some of the procedures of the methods of the embodiments may be implemented by a computer program instructing relevant hardware. The program may be stored in a computer-readable storage medium. When the program is executed, the procedures of the method embodiments may be implemented. The storage medium may include a magnetic disc, an optical disc, a read-only memory (ROM), a random access memory (RAM), or the like.

Disclosed above are merely exemplary embodiments of the present invention, and are not intended to limit the patent scope of the present invention. Therefore, an equivalent change made according to the claims of the present invention still falls within the scope of the present invention.

What is claimed is:

1. A cross-blockchain data processing method, performed by a first server node on a first blockchain, the method comprising:
    obtaining an asset transfer instruction triggered for a first asset on the first blockchain, and configuring an asset state of the first asset to a locked state on the first blockchain, the asset transfer instruction carrying user signature information associated with the first user;
    determining the first asset in the locked state as an asset, and determining a cross-chain asset transfer request corresponding to the asset, the cross-chain asset transfer request carrying system signature information associated with a first private key of the first server node and the user signature information associated with a first user;
    determining a unified access interface on a second blockchain according to a communication mapping relationship between the first blockchain and the second blockchain, the communication mapping relationship being previously established based on a communication protocol agreed by the first blockchain and the second blockchain, the unified access interface being associated with a plurality of transfer interfaces, each transfer interface having a one-to-one correspondence relationship with one node device of a plurality of node devices in the second blockchain;
    selecting, among the plurality of node devices in the second blockchain, a second server node;
    calling an asset transfer interface of the second server node and transmit the cross-chain asset transfer request to the second server node on the second blockchain, so that the second server node verifies the system signature information according to a first public key of the first server node; and
    receiving signing response information transmitted by the second server node in response to determining that the verification succeeds, freezing the asset on the first blockchain according to the signing response information, and
    notifying the second server node to release a second asset associated with the asset on the second blockchain.

2. The method according to claim 1, wherein obtaining the asset transfer instruction comprises:
    determining the asset transfer instruction associated with the first asset in response to an asset transfer operation triggered by a first user for the first asset on the first blockchain, the asset transfer instruction carrying user signature information associated with the first user, the user signature information being obtained after the first asset is signed by using a private key of the first user;
    generating a pre-transfer request according to the user signature information carried in the asset transfer instruction, the first asset, and a public key of the first user, and broadcasting the pre-transfer request to M1 consensus nodes on the first blockchain, so that the M1 consensus nodes verify asset transfer permission of the first user based on the pre-transfer request, M1 being a positive integer greater than 2; and
    configuring the asset state of the first asset to the locked state on the first blockchain in response to determining that it is determined that the first user has the asset transfer permission to transfer the first asset.

3. The method according to claim 2, wherein determining the first asset in the locked state comprises:
    in response to the user signature information being successfully verified by the second server node, determining the first asset in the locked state as the asset, and signing the user signature information and the asset by using the first private key of the first server node, to obtain the system signature information associated with the asset; and
    generating the cross-chain asset transfer request corresponding to the asset according to the system signature information.

4. The method according to claim 3, wherein the cross-chain asset transfer request corresponding to the asset is generated further according to the user signature information, the asset, and the first public key of the first server node.

5. The method according to claim 1, wherein selecting, among the plurality of node devices in the second blockchain, a second server node comprises:
    obtaining idle durations of the plurality of node devices in the second blockchain; and
    selecting a node device with an idle duration greater than a preset idle threshold as the second server node.

6. The method according to claim 1, wherein receiving the signing response information comprises:
    receiving the signing response information transmitted by the second server node in response to determining that the verification succeeds, and changing the asset state of the asset to a frozen state on the first blockchain according to the signing response information;
    obtaining an asset recovery address associated with the first blockchain, and adding the asset in the frozen state to the asset recovery address; and
    notifying the second server node to release the second asset associated with the asset on the second blockchain.

7. The method according to claim 1, further comprising:
    obtaining transfer feedback information transmitted by the second server node for the second asset, the transfer feedback information including an asset mapping relationship between the first asset and the second asset, the asset mapping relationship being used for describing a conversion relationship between a first asset type of the first asset and a second asset type of the second asset during asset conversion.

8. The method according to claim 7, wherein:
    the first blockchain is deployed with a first smart contract running on each first node in the first blockchain;
    the second blockchain is deployed with a second smart contract running on each second node in the second blockchain; and
    the asset mapping relationship includes a data structure mapping relationship between the first smart contract and the second smart contract.

9. The method according to claim 8, wherein calling the asset transfer interface comprises:
calling the second smart contract running on the second server node to perform the asset conversion.

10. The method according to claim 8, wherein a language applied to build the first blockchain is different from a language applied to build the second blockchain, and data structures stored in the first and second blockchains are different.

11. A cross-blockchain data processing apparatus, applied to a first server node on a first blockchain, the apparatus comprising: a memory storing computer program instructions; and a processor coupled to the memory and configured to execute the computer program instructions and perform:
obtaining an asset transfer instruction triggered by a first user for a first asset on the first blockchain, and configuring an asset state of the first asset to a locked state on the first blockchain, the asset transfer instruction carrying user signature information associated with the first user;
determining the first asset in the locked state as an asset, and determining a cross-chain asset transfer request corresponding to the asset, the cross-chain asset transfer request carrying system signature information associated with a first private key of the first server node and the user signature information associated with the first user;
determining a unified access interface on a second blockchain according to a communication mapping relationship between the first blockchain and the second blockchain, the communication mapping relationship being previously established based on a communication protocol agreed by the first blockchain and the second blockchain, the unified access interface being associated with a plurality of transfer interfaces, each transfer interface having a one-to-one correspondence relationship with one node device of a plurality of node devices in the second blockchain;
selecting, among the plurality of node devices in the second blockchain, a second server node;
calling an asset transfer interface of the second server node and transmit the cross-chain asset transfer request to the second server node on the second blockchain, so that the second server node verifies the system signature information according to a first public key of the first server node; and
receiving signing response information transmitted by the second server node in response to determining that the verification succeeds, freezing the asset on the first blockchain according to the signing response information, and notify the second server node to release a second asset associated with the asset on the second blockchain.

12. The cross-blockchain data processing apparatus according to claim 11, wherein obtaining the asset transfer instruction includes:
determining the asset transfer instruction associated with the first asset in response to an asset transfer operation triggered by a first user for the first asset on the first blockchain, the asset transfer instruction carrying user signature information associated with the first user, the user signature information being obtained after the first asset is signed by using a private key of the first user;
generating a pre-transfer request according to the user signature information carried in the asset transfer instruction, the first asset, and a public key of the first user, and broadcasting the pre-transfer request to M1 consensus nodes on the first blockchain, so that the M1 consensus nodes verify asset transfer permission of the first user based on the pre-transfer request, M1 being a positive integer greater than 2; and
configuring the asset state of the first asset to the locked state on the first blockchain in response to determining that it is determined that the first user has the asset transfer permission to transfer the first asset.

13. The cross-blockchain data processing apparatus according to claim 12, wherein determining the first asset in the locked state includes:
in response to the system signature information being successfully verified by the second server node, determining the first asset in the locked state as the asset, and signing the user signature information and the asset by using the first private key of the first server node, to obtain the system signature information associated with the asset; and
generating the cross-chain asset transfer request corresponding to the asset according to the system signature information.

14. The cross-blockchain data processing apparatus according to claim 13, wherein the cross-chain asset transfer request corresponding to the asset is generated further according to the user signature information, the asset, and the first public key of the first server node.

15. The cross-blockchain data processing apparatus according to claim 11, wherein selecting, among the plurality of node devices in the second blockchain, a second server node includes:
obtaining idle durations of the plurality of node devices in the second blockchain; and
selecting a node device with an idle duration greater than a preset idle threshold as the second server node.

16. The cross-blockchain data processing apparatus according to claim 11, wherein receiving the signing response information includes:
receiving the signing response information transmitted by the second server node in response to determining that the verification succeeds, and changing the asset state of the asset to a frozen state on the first blockchain according to the signing response information;
obtaining an asset recovery address associated with the first blockchain, and adding the asset in the frozen state to the asset recovery address; and
notifying the second server node to release the second asset associated with the asset on the second blockchain.

17. The cross-blockchain data processing apparatus according to claim 11, wherein the processor is further configured to execute the computer program instructions and perform:
obtaining transfer feedback information transmitted by the second server node for the second asset, the transfer feedback information including an asset mapping relationship between the first asset and the second asset, the asset mapping relationship being used for describing a conversion relationship between a first asset type of the first asset and a second asset type of the second asset during asset conversion.

18. A non-transitory computer-readable storage medium storing computer program instructions executable by at least one processor of a first server node on a first blockchain to perform:
obtaining an asset transfer instruction triggered by a first user for a first asset on the first blockchain, and configuring an asset state of the first asset to a locked state on the first blockchain, the asset transfer instruction carrying user signature information associated with the first user;

determining the first asset in the locked state as an asset, and determining a cross-chain asset transfer request corresponding to the asset, the cross-chain asset transfer request carrying system signature information associated with a first private key of the first server node and the user signature information associated with the first user;

determining a unified access interface on a second blockchain according to a communication mapping relationship between the first blockchain and the second blockchain, the communication mapping relationship being previously established based on a communication protocol agreed by the first blockchain and the second blockchain, the unified access interface being associated with a plurality of transfer interfaces, each transfer interface having a one-to-one correspondence relationship with one node device of a plurality of node devices in the second blockchain;

selecting, among the plurality of node devices in the second blockchain, a second server node;

calling an asset transfer interface of the second server node and transmit the cross-chain asset transfer request to the second server node on the second blockchain, so that the second server node verifies the system signature information according to a first public key of the first server node; and receiving signing response information transmitted by the second server node in response to determining that the verification succeeds, freezing the asset on the first blockchain according to the signing response information, and notify the second server node to release a second asset associated with the asset on the second blockchain.

19. The non-transitory computer-readable storage medium according to claim 18, wherein obtaining the asset transfer instruction includes:

determining the asset transfer instruction associated with the first asset in response to an asset transfer operation triggered by a first user for the first asset on the first blockchain, the asset transfer instruction carrying user signature information associated with the first user, the user signature information being obtained after the first asset is signed by using a private key of the first user;

generating a pre-transfer request according to the user signature information carried in the asset transfer instruction, the first asset, and a public key of the first user, and broadcasting the pre-transfer request to M1 consensus nodes on the first blockchain, so that the M1 consensus nodes verify asset transfer permission of the first user based on the pre-transfer request, M1 being a positive integer greater than 2; and configuring the asset state of the first asset to the locked state on the first blockchain in response to determining that it is determined that the first user has the asset transfer permission to transfer the first asset.

20. The non-transitory computer-readable storage medium according to claim 19, wherein determining the first asset in the locked state includes:

in response to the system signature information being successfully verified by the second server node, determining the first asset in the locked state as the asset, and signing the user signature information and the asset by using the first private key of the first server node, to obtain the system signature information associated with the asset; and generating the cross-chain asset transfer request corresponding to the asset according to the system signature information.

* * * * *